United States Patent
Mori et al.

(10) Patent No.: US 8,077,173 B2
(45) Date of Patent: Dec. 13, 2011

(54) DRIVING DEVICE FOR DRIVING DISPLAY PANEL, DRIVING METHOD AND IC CHIP

(75) Inventors: Mitsuhiro Mori, Osaka (JP); Tomoe Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 703 days.

(21) Appl. No.: 12/294,497

(22) PCT Filed: Apr. 11, 2007

(86) PCT No.: PCT/JP2007/057953
§ 371 (c)(1),
(2), (4) Date: Sep. 25, 2008

(87) PCT Pub. No.: WO2007/119737
PCT Pub. Date: Oct. 25, 2007

(65) Prior Publication Data
US 2010/0231565 A1    Sep. 16, 2010

(30) Foreign Application Priority Data
Apr. 14, 2006 (JP) .................................. 2006-112098
Mar. 8, 2007 (JP) .................................. 2007-058552

(51) Int. Cl.
G06F 3/038 (2006.01)
G09G 5/00 (2006.01)
G09G 3/28 (2006.01)
(52) U.S. Cl. .............. 345/214; 345/60; 345/63; 345/68; 345/204
(58) Field of Classification Search .............. 345/55, 345/60, 63, 66, 68, 204, 211, 212, 213, 214; 315/167, 169.1, 169.4
See application file for complete search history.

(56) References Cited

U.S. PATENT DOCUMENTS

| 3,903,516 A * | 9/1975 | Mauro, Jr. ........................ 345/68 |
| 6,331,843 B1 | 12/2001 | Kasahara et al. |
| 6,351,253 B2 | 2/2002 | Kasahara et al. |
| 6,353,424 B2 | 3/2002 | Kasahara et al. |
| 6,380,943 B1 | 4/2002 | Morita et al. |
| 6,384,803 B2 | 5/2002 | Kasahara et al. |
| 6,388,645 B2 | 5/2002 | Kasahara et al. |
| 6,388,678 B1 | 5/2002 | Kasahara et al. |

(Continued)

FOREIGN PATENT DOCUMENTS

EP          1026655          8/2000

(Continued)

OTHER PUBLICATIONS

English language Abstract of JP 2003-337568 A.

(Continued)

*Primary Examiner* — My-Chau T Tran
(74) *Attorney, Agent, or Firm* — Greenblum & Bernstein, P.L.C.

(57) ABSTRACT

A driving device that drives a display device using a subfield driving method eliminates the need to use an expensive 1-frame delay memory. A compensated sustain pulse data generator enables displaying the same frame information on the display panel even when the 1-frame delay memory is eliminated. The drive data is generated so that the data that is delayed one frame and is included in the data output from the subfield processing unit and the data that is delayed one frame and is included in the data output from the compensated sustain pulse data generator are mutually cancelling.

19 Claims, 14 Drawing Sheets

U.S. PATENT DOCUMENTS

| | | |
|---|---|---|
| 6,400,346 B2 | 6/2002 | Kasahara et al. |
| 6,674,429 B1 | 1/2004 | Correa et al. |
| 6,690,388 B2 | 2/2004 | Kasahara et al. |
| 6,724,356 B1 | 4/2004 | Kojima et al. |
| 6,900,781 B1 | 5/2005 | Mori et al. |
| 7,109,980 B2 * | 9/2006 | Shigeta et al. ............... 345/204 |
| 7,439,941 B1 | 10/2008 | Kumakura et al. |
| 2003/0173903 A1 | 9/2003 | Takeuchi et al. |
| 2004/0008194 A1 * | 1/2004 | Shigeta et al. ............... 345/204 |
| 2005/0035928 A1 | 2/2005 | De Greef |
| 2008/0068405 A1 | 3/2008 | Kumakura et al. |
| 2009/0040148 A1 | 2/2009 | Kumakura et al. |

FOREIGN PATENT DOCUMENTS

| | | |
|---|---|---|
| EP | 1065645 A2 | 1/2001 |
| EP | 1164562 | 12/2001 |
| EP | 1331624 | 7/2003 |
| EP | 1345199 A2 | 9/2003 |
| JP | 11-231825 A | 8/1999 |
| JP | 2001-022318 A | 1/2001 |
| JP | 2001-075530 A | 3/2001 |
| JP | 2003-337568 A | 11/2003 |
| WO | 00/17845 A | 3/2000 |

OTHER PUBLICATIONS

English language Abstract of JP 2001-075530 A.

English language Abstract of JP 2001-022318 A.

English language Abstract of JP 11-231825 A.

* cited by examiner

Fig. 5

| | | | | | |
|---|---|---|---|---|---|
| (A) INPUT | VIDEO 0 | VIDEO 1 | VIDEO 2 | VIDEO 3 | VIDEO 4 |
| (B) PREDICTED POWER DETECTION UNIT 7 | | APL0 | APL1 | APL2 | APL3 |
| (C) FEATURE OUTPUT UNIT 9 | | AI0 | AI1 | AI2 | AI3 |
| (D) DISPLAY PROCESSING UNIT 2 | | | VIDEO 1*AI0 | VIDEO 2*AI1 | VIDEO 3*AI2 | VIDEO 4*AI3 |
| (E) DRIVE DATA GENERATOR 8 | | | DRIVE DATA 0 (SUSTAIN PULSE 0, DRIVE MULTIPLE 0) | DRIVE DATA 1 (SUSTAIN PULSE 1, DRIVE MULTIPLE 1) | DRIVE DATA 2 (SUSTAIN PULSE 2, DRIVE MULTIPLE 2) | DRIVE DATA 3 (SUSTAIN PULSE 3, DRIVE MULTIPLE 3) |
| (F) SUBFIELD PROCESSING UNIT 4 (VIDEO DATA OUTPUT) | | | | VIDEO 1*AI0 [i] | VIDEO 2*AI1 [i] | VIDEO 3*AI2 [i] | VIDEO 4*AI3 [i] |
| (G) LATCH 10 (F1) | | | | SUSTAIN PULSE 0 [i] | SUSTAIN PULSE 1 [i] | SUSTAIN PULSE 2 [i] | SUSTAIN PULSE 3 [i] |
| (H) LATCH 11 | | | | DRIVE MULTIPLE 0 | DRIVE MULTIPLE 1 | DRIVE MULTIPLE 2 | DRIVE MULTIPLE 3 |
| (I) LATCH 14 | | | | AI0 | AI1 | AI2 | AI3 |
| (J) COMPENSATION PROCESSING UNIT 12 | | | | AI1*DRIVE MULTIPLE 1 / AI0*DRIVE MULTIPLE 0 | AI2*DRIVE MULTIPLE 2 / AI1*DRIVE MULTIPLE 1 | AI3*DRIVE MULTIPLE 3 / AI2*DRIVE MULTIPLE 2 | AI4*DRIVE MULTIPLE 4 / AI3*DRIVE MULTIPLE 3 |
| (K) MULTIPLIER 18 (F2) | | | | SUSTAIN PULSE 0[i]* AI1*DRIVE MULTIPLE 1 / AI0*DRIVE MULTIPLE 0 | SUSTAIN PULSE 1[i]* AI2*DRIVE MULTIPLE 2 / AI1*DRIVE MULTIPLE 1 | SUSTAIN PULSE 2[i]* AI3*DRIVE MULTIPLE 3 / AI2*DRIVE MULTIPLE 2 | SUSTAIN PULSE 3[i]* AI4*DRIVE MULTIPLE 4 / AI3*DRIVE MULTIPLE 3 |

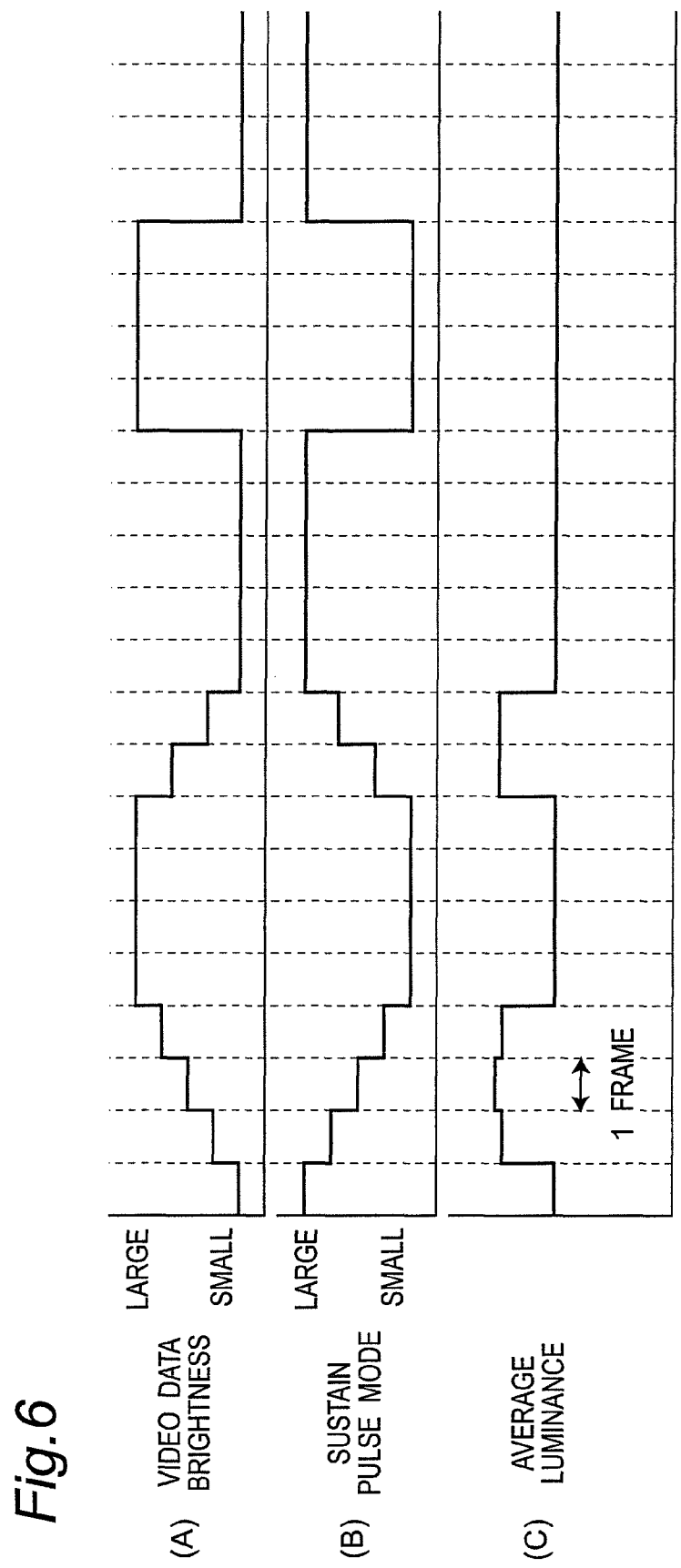

DAYLIGHT SCENE (1X MODE)

NIGHT SCENE (5X MODE)

Fig.16

(A) INPUT

| VIDEO 0 | VIDEO 1 | VIDEO 2 | VIDEO 3 |
|---|---|---|---|
| DAYLIGHT SCENE (1X MODE) | DAYLIGHT SCENE (1X MODE) | NIGHT SCENE (5X MODE) | NIGHT SCENE (5X MODE) |

(B) MULTIPLIER 18(F2)

① SUSTAIN PULSE 0[i] × $\frac{AI1 \times DRIVE\ MULTIPLE1}{AI0 \times DRIVE\ MULTIPLE0}$    ② SUSTAIN PULSE 1[i] × $\frac{AI2 \times DRIVE\ MULTIPLE2}{AI1 \times DRIVE\ MULTIPLE1}$    ③ SUSTAIN PULSE 2[i] × $\frac{AI3 \times DRIVE\ MULTIPLE3}{AI2 \times DRIVE\ MULTIPLE2}$ (C) process ①   $\frac{AI1 \times DRIVE\ MULTIPLE1}{AI0 \times DRIVE\ MULTIPLE0} = 1$

| SF1 | SF2 | SF3 | SF4 | SF5 | SF6 | SF7 | SF8 | TOTAL |
|---|---|---|---|---|---|---|---|---|
| 1 | 2 | 4 | 8 | 16 | 32 | 64 | 128 | 255 |

⇒

| SF1 | SF2 | SF3 | SF4 | SF5 | SF6 | SF7 | SF8 | TOTAL |
|---|---|---|---|---|---|---|---|---|
| 1 | 2 | 4 | 8 | 16 | 32 | 64 | 128 | 255 |

(D) process ②   $\frac{AI2 \times DRIVE\ MULTIPLE2}{AI1 \times DRIVE\ MULTIPLE1} = 5$

| SF1 | SF2 | SF3 | SF4 | SF5 | SF6 | SF7 | SF8 | TOTAL |
|---|---|---|---|---|---|---|---|---|
| 1 | 2 | 4 | 8 | 16 | 32 | 64 | 128 | 255 |

⇒

| SF1 | SF2 | SF3 | SF4 | SF5 | SF6 | SF7 | SF8 | TOTAL |
|---|---|---|---|---|---|---|---|---|
| 5 | 10 | 20 | 40 | 80 | 160 | 320 | 640 | 1275 |

(E) process ③   $\frac{AI3 \times DRIVE\ MULTIPLE3}{AI2 \times DRIVE\ MULTIPLE2} = 1$

| SF1 | SF2 | SF3 | SF4 | SF5 | SF6 | TOTAL |
|---|---|---|---|---|---|---|
| 1 | 25 | 100 | 180 | 325 | 640 | 1275 |

⇒

| SF1 | SF2 | SF3 | SF4 | SF5 | SF6 | TOTAL |
|---|---|---|---|---|---|---|
| 1 | 25 | 100 | 180 | 325 | 640 | 1275 |

DRIVING DEVICE FOR DRIVING DISPLAY PANEL, DRIVING METHOD AND IC CHIP

TECHNICAL FIELD

The present invention relates to a driving device for driving a display panel such as a plasma display panel (PDP) or digital micromirror device (DMD) using a subfield driving method, to a driving method, and to an IC chip.

BACKGROUND ART

Japanese Unexamined Patent Appl. Pub. JP-A-H11-231825 teaches a driving device for driving a display device using a subfield driving method. The driving device taught in JP-A-H11-231825 sends the acquired video data to a 1-field delay 111 and to a brightness detector 110. The brightness detector 110 detects the average brightness level in one field, and the average brightness signal output from the brightness detector 110 is delayed one field period. The multiplier 112 and gray level adjustment unit 114 that process signals parallel to the brightness detector 110 must process the signals for the same field as the signals acquired from the brightness detector 110, and the 1-field delay 111 is therefore inserted before the multiplier 112.

DISCLOSURE OF INVENTION

Problem to be Solved by the Invention

Because the 1-field delay 111 must store pixel data for the entire field, however, it must be a high capacity memory device, which is expensive. A driving device according to the present invention for driving a display panel using a subfield driving method solves the foregoing problem of the related art by not using a 1-field delay 111, that is, a frame delay memory (where a field and a frame have the same content below).

Means for Solving the Problem

A first aspect of the invention is a driving device having a predicted power detection unit that receives approximately one frame of video data, calculates power consumption for that frame, and outputs a predicted power consumption value; a feature output unit that outputs a fixed multiple coefficient representing a feature of the video data based on the predicted power consumption; a display processing unit that adjusts the video data using the fixed multiple coefficient and outputs the adjusted video data; a subfield processing unit that outputs a subfield signal after approximately one frame period based on the adjusted video data; a drive data generating unit that generates drive data including sustain pulse data based on the predicted power consumption; and a latch that holds the sustain pulse data one frame period and outputs the previous sustain pulse data. The driving device drives a display panel by means of the subfield signal and previous sustain pulse data.

A second aspect of the invention is a driving device having a predicted power detection unit that receives approximately one frame of video data, calculates power consumption for that frame, and outputs a predicted power consumption value; a feature output unit that outputs a fixed multiple coefficient representing a feature of the video data based on the predicted power consumption; a display processing unit that adjusts the video data using the fixed multiple coefficient and outputs the adjusted video data; a subfield processing unit that outputs a subfield signal after approximately one frame period based on the adjusted video data; a drive data generating unit that generates drive data including sustain pulse data and a drive multiple based on the predicted power consumption; a first latch that holds the sustain pulse data one frame period and outputs the previous sustain pulse data; a second latch that holds the drive multiple one frame period and outputs the previous drive multiple; a third latch that holds the fixed multiple coefficient one frame period and outputs the previous fixed multiple coefficient; and a compensated sustain pulse data generating unit that receives a direct drive multiple from the drive data generating unit, a direct fixed multiple coefficient from the feature output unit, the previous drive multiple from the second latch, the previous fixed multiple coefficient from the third latch, and outputs compensated sustain pulse data. The driving device drives a display panel by means of the subfield signal and compensated sustain pulse data.

In a driving device according to a third aspect of the invention the compensated sustain pulse data is calculated using the equation previous sustain pulse count*(direct fixed multiple coefficient*direct drive multiple)/(previous fixed multiple coefficient*previous drive multiple).

A driving device according to a fourth aspect of the invention also has a compensation evaluation unit; and a selection unit that receives previous sustain pulse data and compensated sustain pulse data. The compensation evaluation unit receives the direct fixed multiple coefficient from the feature output unit, the previous fixed multiple coefficient from the third latch, the direct drive multiple from the drive data generating unit, and the previous drive multiple from the second latch, compares the rate of change $$(\text{direct fixed multiple coefficient}*\text{direct drive multiple})/(\text{previous fixed multiple coefficient}*\text{previous drive multiple})$$

with a predetermined threshold value, outputs the compensated sustain pulse data from the selection unit if the rate of change is greater than the threshold value, and outputs the previous sustain pulse data from the selection unit if the rate of change is less than or equal to threshold value.

A driving device according to a fifth aspect of the invention also has an overflow detection unit. The overflow detection unit detects if the drive multiple of a next frame is increased from the drive multiple of the frame therebefore, and renders the drive data in one frame period by lowering the drive multiple of the next frame by a predetermined multiple.

A driving device according to a sixth aspect of the invention also has an overflow detection unit. The overflow detection unit detects if the drive multiple of a next frame is increased from the drive multiple of the frame therebefore, and renders the drive data in one frame period by deleting one or more subfields from the next frame in order from the lowest subfield number.

A driving device according to a seventh aspect of the invention also has an overflow detection unit. The overflow detection unit detects if the drive multiple of a next frame is increased from the drive multiple of the frame therebefore, and renders the drive data in one frame period by lowering the drive multiple of the next frame by a predetermined multiple and deleting one or more subfields from the next frame in order from the lowest subfield number.

An eighth aspect of the invention is an IC chip having a predicted power detection unit that receives approximately one frame of video data, calculates power consumption for that frame, and outputs a predicted power consumption value; a feature output unit that outputs a fixed multiple coefficient representing a feature of the video data based on the predicted power consumption; a display processing unit that adjusts the video data using the fixed multiple coefficient and outputs the adjusted video data; a subfield processing unit that outputs a subfield signal after approximately one frame period based on the adjusted video data; a drive data generating unit that generates drive data including sustain pulse data based on the predicted power consumption; and a latch that holds the sustain pulse data one frame period and outputs the previous sustain pulse data. The driving device drives a display panel by means of the subfield signal and previous sustain pulse data.

A ninth aspect of the invention is an IC chip having a predicted power detection unit that receives approximately one frame of video data, calculates power consumption for that frame, and outputs a predicted power consumption value; a feature output unit that outputs a fixed multiple coefficient representing a feature of the video data based on the predicted power consumption; a display processing unit that adjusts the video data using the fixed multiple coefficient and outputs the adjusted video data; a subfield processing unit that outputs a subfield signal after approximately one frame period based on the adjusted video data; a drive data generating unit that generates drive data including sustain pulse data and a drive multiple based on the predicted power consumption; a first latch that holds the sustain pulse data one frame period and outputs the previous sustain pulse data; a second latch that holds the drive multiple one frame period and outputs the previous drive multiple; a third latch that holds the fixed multiple coefficient one frame period and outputs the previous fixed multiple coefficient; and a compensated sustain pulse data generating unit that receives a direct drive multiple from the drive data generating unit, a direct fixed multiple coefficient from the feature output unit, the previous drive multiple from the second latch, and the previous fixed multiple coefficient from the third latch, and outputs compensated sustain pulse data. The IC chip drives a display panel by means of the subfield signal and compensated sustain pulse data.

In an IC chip according to a tenth aspect of the invention the compensated sustain pulse data is calculated using the equation:

previous sustain pulse count*(direct fixed multiple coefficient*direct drive multiple)/(previous fixed multiple coefficient*previous drive multiple).

An IC chip according to an eleventh aspect of the invention also has an overflow detection unit, and the overflow detection unit detects if the drive multiple of a next frame is increased from the drive multiple of the frame therebefore, and renders the drive data in one frame period by lowering the drive multiple of the next frame by a predetermined multiple.

An IC chip according to an twelfth aspect of the invention also has an overflow detection unit, and the overflow detection unit detects if the drive multiple of a next frame is increased from the drive multiple of the frame therebefore, and renders the drive data in one frame period by deleting one or more subfields from the next frame in order from the lowest subfield number.

An IC chip according to an thirteenth aspect of the invention also has an overflow detection unit, and the overflow detection unit detects if the drive multiple of a next frame is increased from the drive multiple of the frame therebefore, and renders the drive data in one frame period by lowering the drive multiple of the next frame by a predetermined multiple and deleting one or more subfields from the next frame in order from the lowest subfield number.

A fourteenth aspect of the invention is a driving method having steps of receiving approximately one frame of video data, calculating power consumption for that frame, and outputting a predicted power consumption value; outputting a fixed multiple coefficient representing a feature of the video data based on the predicted power consumption; adjusting the video data using the fixed multiple coefficient and outputting the adjusted video data; outputting a subfield signal after approximately one frame period based on the adjusted video data; generating drive data including sustain pulse data based on the predicted power consumption; holding the sustain pulse data one frame period and outputting the previous sustain pulse data; and driving a display panel by means of subfield signals and the previous sustain pulse data.

A fifteenth aspect of the invention is a driving method having steps of receiving approximately one frame of video data, calculating power consumption for that frame, and outputting a predicted power consumption value; outputting a fixed multiple coefficient representing a feature of the video data based on the predicted power consumption; adjusting the video data using the fixed multiple coefficient and outputting the adjusted video data; outputting a subfield signal after approximately one frame period based on the adjusted video data; generating drive data including sustain pulse data and a drive multiple based on the predicted power consumption; holding the sustain pulse data one frame period and outputting the previous sustain pulse data; holding the drive multiple one frame period and outputting the previous drive multiple; holding the fixed multiple coefficient one frame period and outputting the previous fixed multiple coefficient; receiving a direct drive multiple, a direct fixed multiple coefficient, the previous drive multiple, and the previous fixed multiple coefficient, and outputting compensated sustain pulse data; and driving a display panel by means of the subfield signal and compensated sustain pulse data.

In a driving method according to a sixteenth aspect of the invention the compensated sustain pulse data is calculated using the equation:

previous sustain pulse count*(direct fixed multiple coefficient*direct drive multiple)/(previous fixed multiple coefficient*previous drive multiple).

The driving method according to a seventeenth aspect of the invention also has a step of detecting if the drive multiple of a next frame is increased from the drive multiple of the frame therebefore, and rendering the drive data in one frame period by lowering the drive multiple of the next frame by a predetermined multiple.

The driving method according to an eighteenth aspect of the invention also has a step of detecting if the drive multiple of a next frame is increased from the drive multiple of the frame therebefore, and rendering the drive data in one frame period by deleting one or more subfields from the next frame in order from the lowest subfield number.

The driving method according to a nineteenth aspect of the invention also has a step of detecting if the drive multiple of a next frame is increased from the drive multiple of the frame therebefore, and rendering the drive data in one frame period by lowering the drive multiple of the next frame by a predetermined multiple and deleting one or more subfields from the next frame in order from the lowest subfield number.

EFFECT OF THE INVENTION

The driving device using a subfield driving method, the driving method, and the IC chip according to the present invention do not use a 1-frame delay memory and can therefore be achieved at low, cost.

Furthermore, because a signal with no frame shifting can be used, a loss of video quality is not incurred by eliminating the 1-frame delay memory.

In addition, by using a process that lowers the mode multiple and deletes subframes when increasing the brightness of a dark picture, image processing can be completed within one frame period without losing image detail, and sufficient brightness can be achieved.

BRIEF DESCRIPTION OF DRAWINGS

FIG. 5 is a timing chart of the output signals from the main parts of the driving device shown in FIG. 4.

FIG. 6 describes the operation of the driving device shown in FIG. 4.

FIG. 16 is a timing chart of output signals from the main parts of the driving device shown in FIG. 12.

Figure 2:
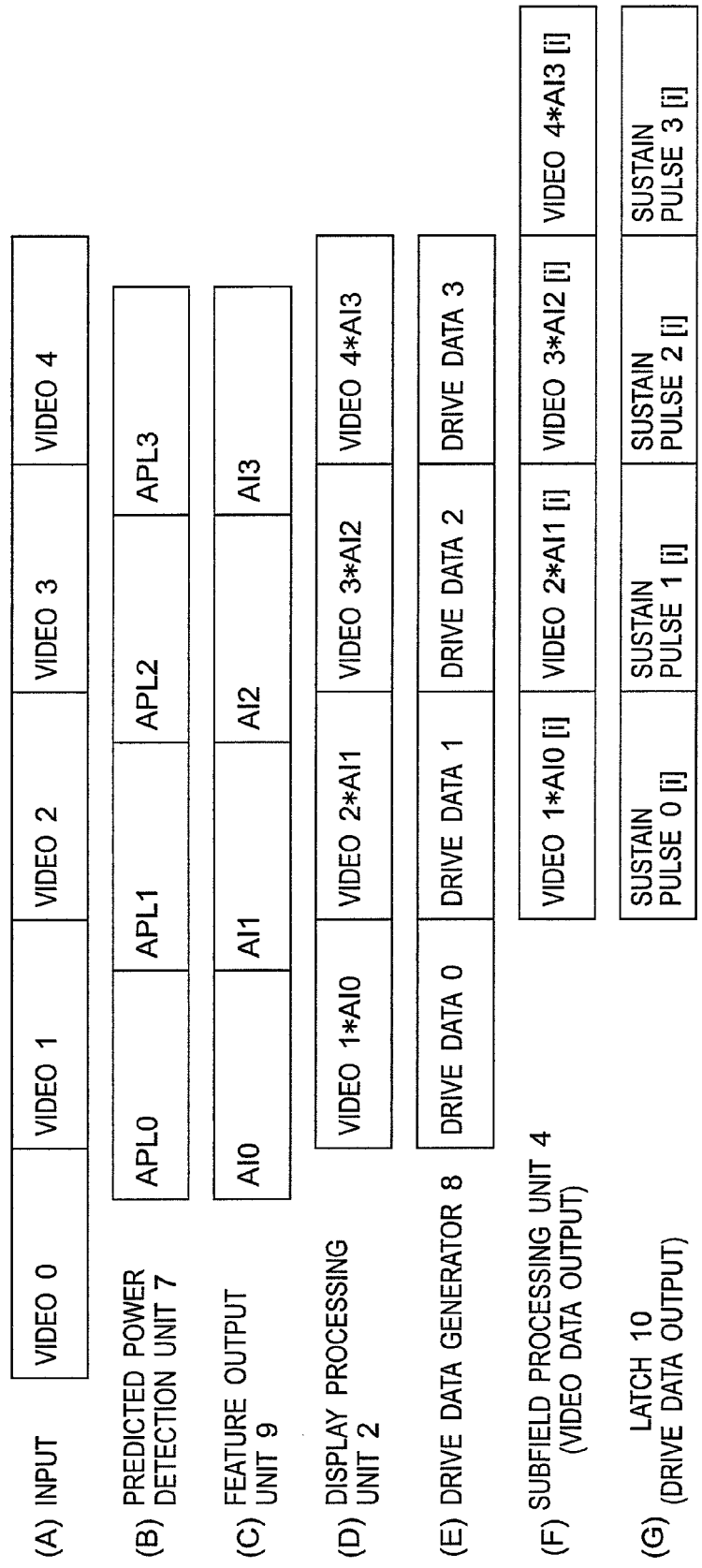
FIG. 2 is a timing chart of the output signals from the main parts of the driving device shown in FIG. 1.

KEY TO THE FIGURES 2 display processing unit
4 subfield processing unit
6 video data output pin
7 predicted power detection unit
8 drive data generator
9 feature output unit
10, 11, 14 latches
12 compensation processing unit
16 compensation evaluation unit
18 multiplier
19 compensated sustain pulse data generator
20 selection unit
22 drive data output pin
24 video driver unit
26, 28 scanning-sustain-deletion drive unit
30 PDP
40 overflow detection unit

BEST MODE FOR CARRYING OUT THE INVENTION

Embodiment 1

Figure 1:
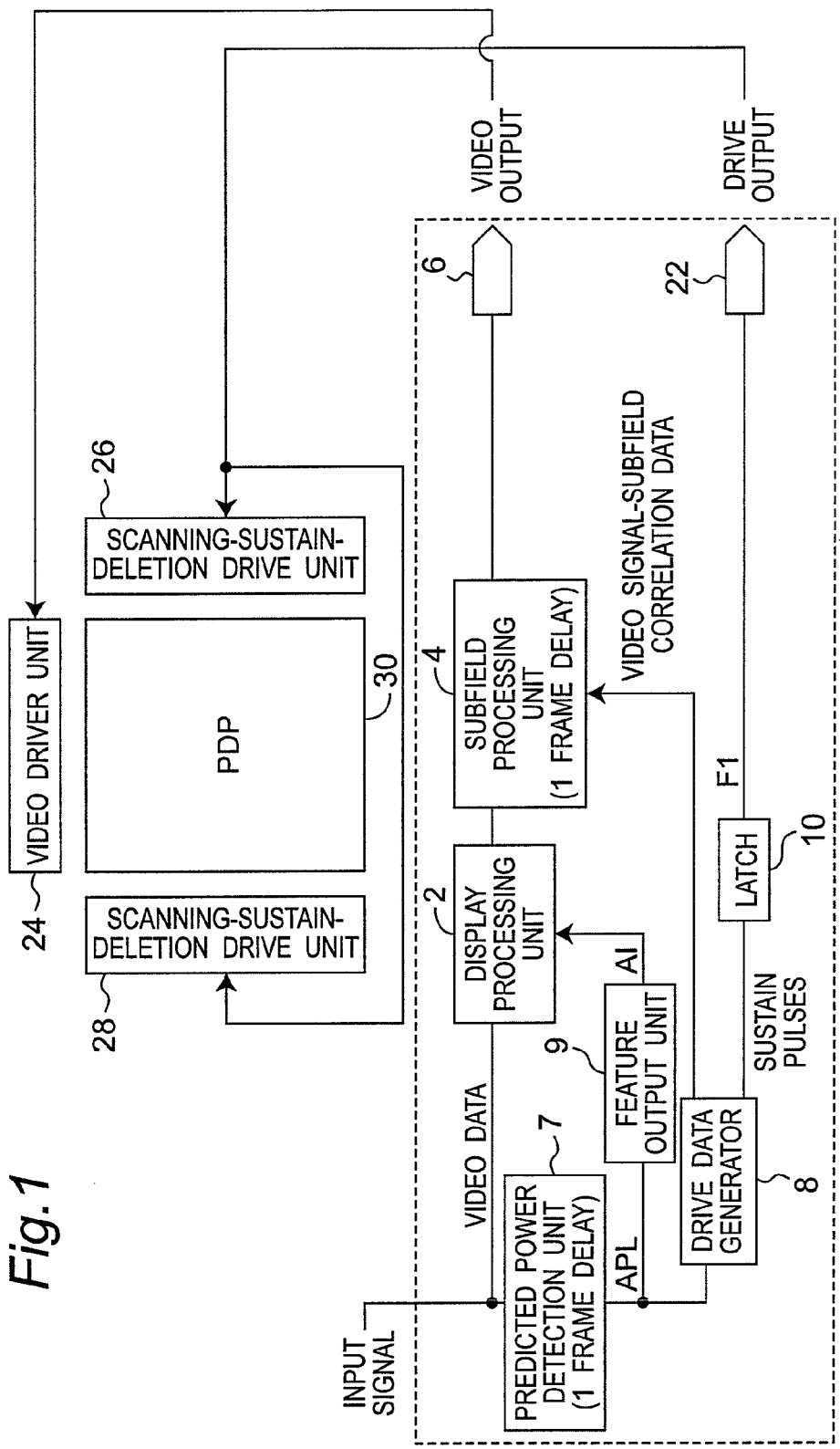
FIG. 1 is a block diagram of a driving device according to a first embodiment of the invention.

FIG. 1 is a block diagram of a driving device that uses a subfield driving method according to a first embodiment of the invention. Shown in FIG. 1 are a display processing unit 2, subfield processing unit 4, video data output pin 6, predicted power detection unit 7 with a power prediction capability, a drive data generator 8 that generates drive data containing sustain pulse and video signal subfield data, a feature output unit 9, a latch 10, a drive data output pin 22 from which the sustain pulse is output, a video driver unit 24, scanning-sustain-deletion drive units 26 and 28, and a plasma display panel (PDP) 30. The portion surrounded by a dotted line in FIG. 1 can be rendered on an IC chip. The devices of the subfield processing unit 4 that delay signals one frame can be rendered externally to the IC chip.

A 1-frame delay memory that delays the video data one frame is not used in the circuit block from the pin receiving the input signal to the subfield processing unit 4 in the driving device according to this first embodiment of the invention. More specifically, a 1-frame delay memory that delays the video data one frame is not used to absorb the 1-frame delay produced by the predicted power detection unit 7. Such a 1-frame delay memory device must have a very large capacity, and is therefore extremely expensive. The present invention does not require using such a 1-frame delay memory, and can therefore render the semiconductor chip inexpensively. The size of the semiconductor chip can also be reduced.

The operation of the driving device according to this embodiment of the invention is described next.

FIG. 2 is a timing chart showing the signal timing at selected points in FIG. 1.

As shown in FIG. 2 (A), video data in frame units is input as video 0, video 1, video 2, video 3, video 4, and so forth.

The predicted power detection unit 7 computes the video signal total APL for one frame, for example, as the predicted power consumption based on the input video data. More specifically, the predicted power detection unit 7 computes the sum of the signal levels of the R, G, and B video signals in the area displayed on screen (referred to below as the "effective video period"). The video signal total for video 0, video 1, video 2, and so forth is denoted APL0, APL1, APL2, and so forth. After acquiring valid data for one frame, the video signal total is calculated for the one frame. Therefore, as shown in FIG. 2 (B), the video signal total is output after an approximately 1-frame delay. This is referred to as an "approximate" delay because the video signal total can be calculated when the effective video period within the one frame period ends. The predicted power detection unit 7 may alternatively detect the peak level or other information related to power consumption instead of the video signal total. The video signal total APL is output to the drive data generator 8 and to the feature output unit 9.

Based on the video signal total APL, which is one predicted power consumption value, the drive data generator 8 determines the number of sustain pulses in each subfield. In the basic mode (1× mode), there are 8 subfields in 1 frame. The 8 subfields are weighted to respectively emit 1, 2, 4, 8, 16, 32, 64, and 128 sustain pulses.

In this case the brightest pixel is presented when all subfields are selected and all sustain pulses are emitted, or more specifically when 255 sustain pulses are emitted. Conversely, the darkest pixel is presented when no subfield is selected and zero sustain pulses are emitted. By changing the combination of selected subfields, the number of emitted pulses can be controlled in 256 levels from 0 to 255, and display brightness can therefore be controlled.

In the 2× mode, the subfields are weighted to respectively emit 2, 4, 8, 16, 32, 64, 128, and 256 sustain pulses. In the 3× mode, the subfields are weighted to respectively emit 3, 6, 12, 24, 48, 96, 192, and 384 sustain pulses. In a likewise manner 4× and 5× modes are also prepared.

When the video signal total APL indicates an extremely dark level, such as an image of the night sky, the 5× mode is selected. Conversely, when the video signal total APL indicates an extremely bright scene, such as a snow scene, the 1× mode is selected. When the 1× mode is selected, drive data containing the sustain pulse count data (1, 2, 4, 8, 16, 32, 64, 128) is output from the drive data generator 8. The drive data generator 8 thus outputs sustain pulse count data corresponding to the mode selected by frame unit as the drive data 0, drive data 1, drive data 2, and so forth as shown in FIG. 2 (E).

The multiple of the mode is referred to herein as the "drive multiple." The drive multiples of the 1× mode, 2× mode, 3× mode, 4× mode, and 5× mode are thus 1×, 2×, 3×, 4×, and 5×.

The drive data generator 8 outputs video signal-subfield correlation data corresponding to the mode selected by frame unit to the subfield processing unit. The drive data generator 8 uses a ROM table, for example. Based on the input video signal total, drive data containing the appropriate sustain pulse count data and video signal-subfield correlation data is selected from the ROM table.

The feature output unit 9 outputs a fixed multiple coefficient based on the video signal total APL. The fixed multiple coefficient is feature data for directly adjusting the video data, and is used with the drive multiple for power adjustment as briefly described next.

If the image is bright and the APL is high, the drive multiple is changed from 2× to 1×, for example, to adjust the power if the APL exceeds a certain threshold value. If the APL continues to rise, power consumption rises as the APL rises. To prevent this and hold power consumption constant, the fixed multiple coefficient is gradually reduced, and the video signal itself is gradually reduced to 0.95×, 0.8×, 0.85×, 0.8×, and so forth. This fixed multiple coefficient is described in detail in Japanese Unexamined Patent Appl. Pub. JP-A-H11-231825.

The fixed multiple coefficient Al computed for each frame is output as Al0, Al1, Al2 and so forth as shown in FIG. 2 (C). Information other than the fixed multiple coefficient may also be included in the feature data.

The display processing unit 2 applies a computation using the video data and fixed multiple coefficient Al, and outputs adjusted video data. As a simple example, the fixed multiple coefficient Al is multiplied by the video data, and the product is output. For example, when video 1 is input, fixed multiple coefficient Al0 is also input, and the video adjusted as the product (video 1*Al0) is output. As shown in FIG. 2 (D), the video is adjusted and output frame by frame, that is, (video 1*Al0), (video 2*Al1), (video 3*Al2), and so forth.

Based on the adjusted video (video*Al), the subfield processing unit 4 determines the subfield combination for each pixel. For example, if the video signal level of a particular pixel in the 1× mode is 36, subfield 3 and subfield 6 are selected so that 4+32 sustain pulses are emitted. The subfields are thus selected for each pixel. The process executed by the subfield processing unit 4 takes approximately one frame. As shown in FIG. 2 (F), the video data converted to subfield data, that is, (video 1*Al0)[i], (video 2*Al1)[i], (video 3*Al2)[i], and so forth, is output. The index [i] denotes the subfield number. This is described in further detail in the second embodiment below.

The video data converted to subfield data is output to the video driver unit 24 from the video data output pin 6.

The latch 10 then holds the sustain pulse information contained in the drive data generated by the drive data generator 8 for one frame period, and outputs sustain pulse 0[i], sustain pulse 1[i], sustain pulse 2[i], and so forth as shown in FIG. 2 (G). The sustain pulse data output from the latch 10 is sent through the drive data output pin 22 to the scanning-sustain-deletion drive units 26 and 28. Note that the latch 10 delays output one frame period because the video data is delayed one frame period by the subfield processing unit 4.

The data shown in FIGS. 2 (F) and (G) is applied to drive the plasma display panel 30, and the actual display is driven using the following data.

(video1*Al0)[i]*sustain pulse 0[i]

In this case, the sustain pulse 0[i] count of the preceding frame is used for the current picture, such as video 1. There is no practical problem with this method because the correlation between any two consecutive frames is high in video content. This is described in further detail with reference to FIG. 3.

Figure 3:
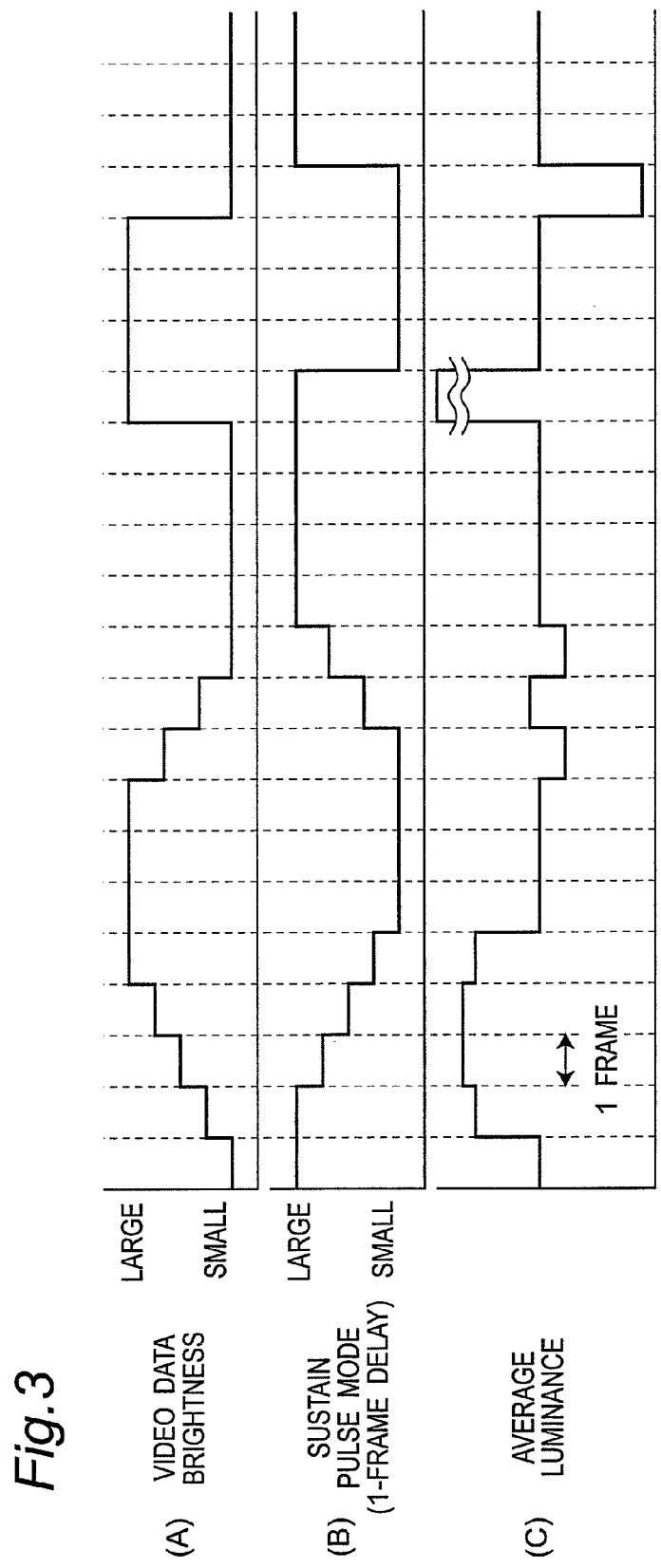
FIG. 3 describes the operation of the driving device shown in FIG. 1.

FIG. 3 (A) shows the video signal total as an example of a quantity that is correlated to the brightness of the actual picture, and FIG. 3 (B) shows the mode of the sustain pulses output from the drive data generator 8. The sustain pulse mode is generated based on the output APL of the predicted power detection unit 7, and is therefore delayed one frame period. As shown in FIG. 3 (A), as the video signal total APL increases, the sustain pulse mode decreases from the 5× mode, 4× mode, 3× mode, and so forth, but with a delay of one frame period. The signal total (FIG. 3 (A)) of the video data and the mode (FIG. 3 (B)) of the sustain pulse are multiplied together to obtain the average brightness of the video actually presented on the display (FIG. 3 (C)), that is, the power consumption. For example, if the signal total of the video data changes 1, 2, 3, 4, 5 sequentially frame by frame from the beginning as shown in FIG. 3 (A), the sustain pulse mode also changes 5×, 5×, 4×, 3×, 2×. There are two 5× modes at the beginning because setting the sustain pulse mode is delayed one frame period from the video data signal totals. In this case the average brightness (FIG. 3 (C)), which is the product of the video data signal total and the sustain pulse mode, changes 5, 10, 12, 12. Note that these values are used by way of example only to describe how to read the graphs. As will be known from the figure, the average brightness actually displayed on the screen, that is, the power consumption, does not change that much even though there is a delay of one frame period. Except when there is a sharp change in brightness, the average brightness presented on the PDP screen is therefore substantially constant and varies little when the screen changes normally as shown in FIG. 3 (C).

This first embodiment of the invention thus does not use a 1-frame delay memory to delay the video data one frame in order to absorb the 1-frame delay introduced by the predicted power detection unit 7, and thus affords a low cost driving device.

When the picture changes sharply, such as switching from a dark scene to a bright scene, such as changing from a night scene to a daytime scene, the drive data for the dark scene in the preceding frame (such as 4× mode drive data) is used to display the bright scene in the current frame. In this case, the bright picture is driven using the 4× mode drive data, the average brightness instantly becomes higher in the current frame, power consumption also rises instantly, and an unnatural picture is presented. When the picture conversely switches from a bright scene to a dark scene, the average brightness of the frame where the change occurs instantly drops, power consumption also instantly drops, and an unnatural picture is presented.

Such unnatural pictures are eliminated by the driving device according to the second embodiment described below.

Embodiment 2

Figure 4:
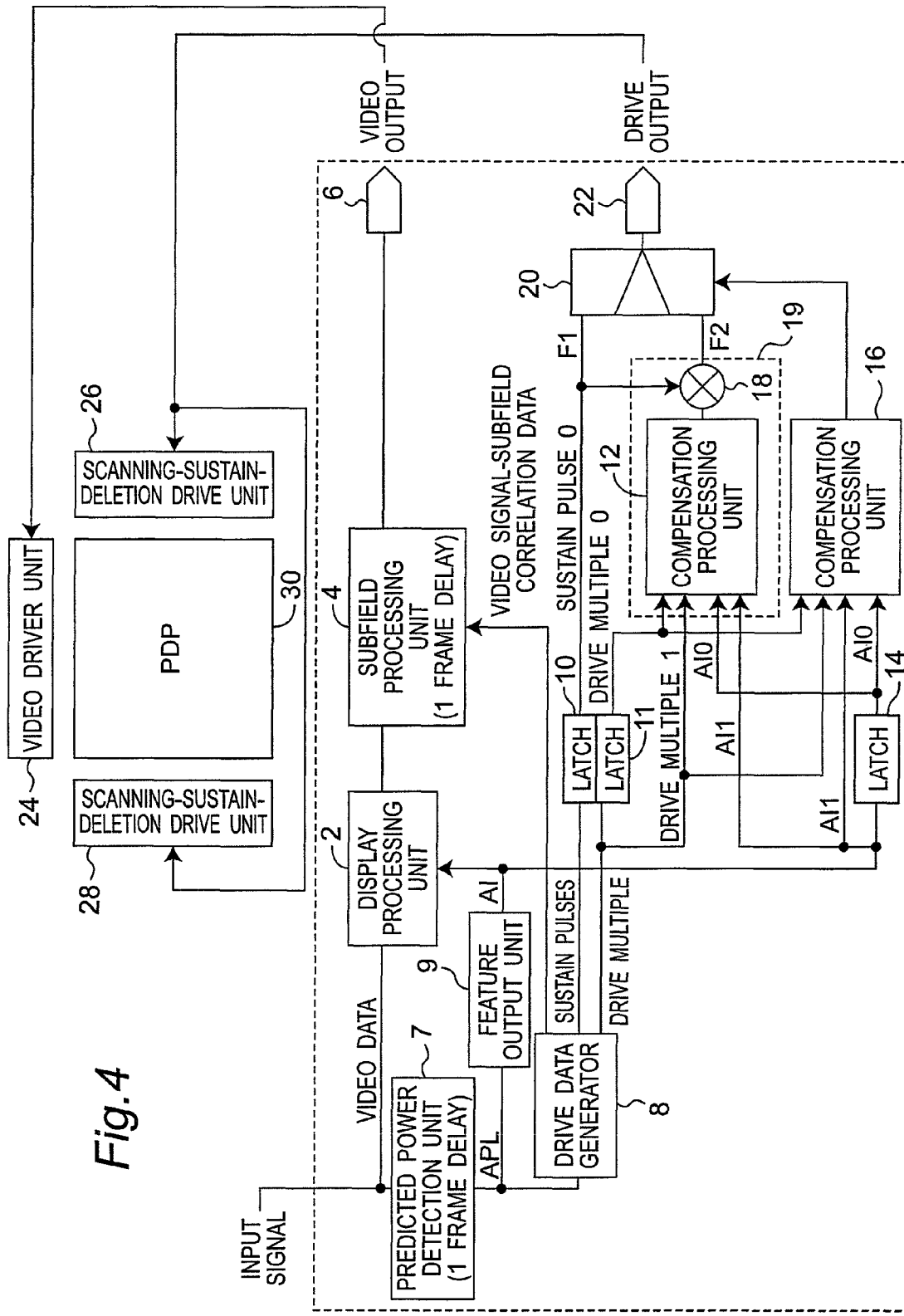
FIG. 4 is a block diagram of a driving device according to a second embodiment of the invention.
Figure 7:
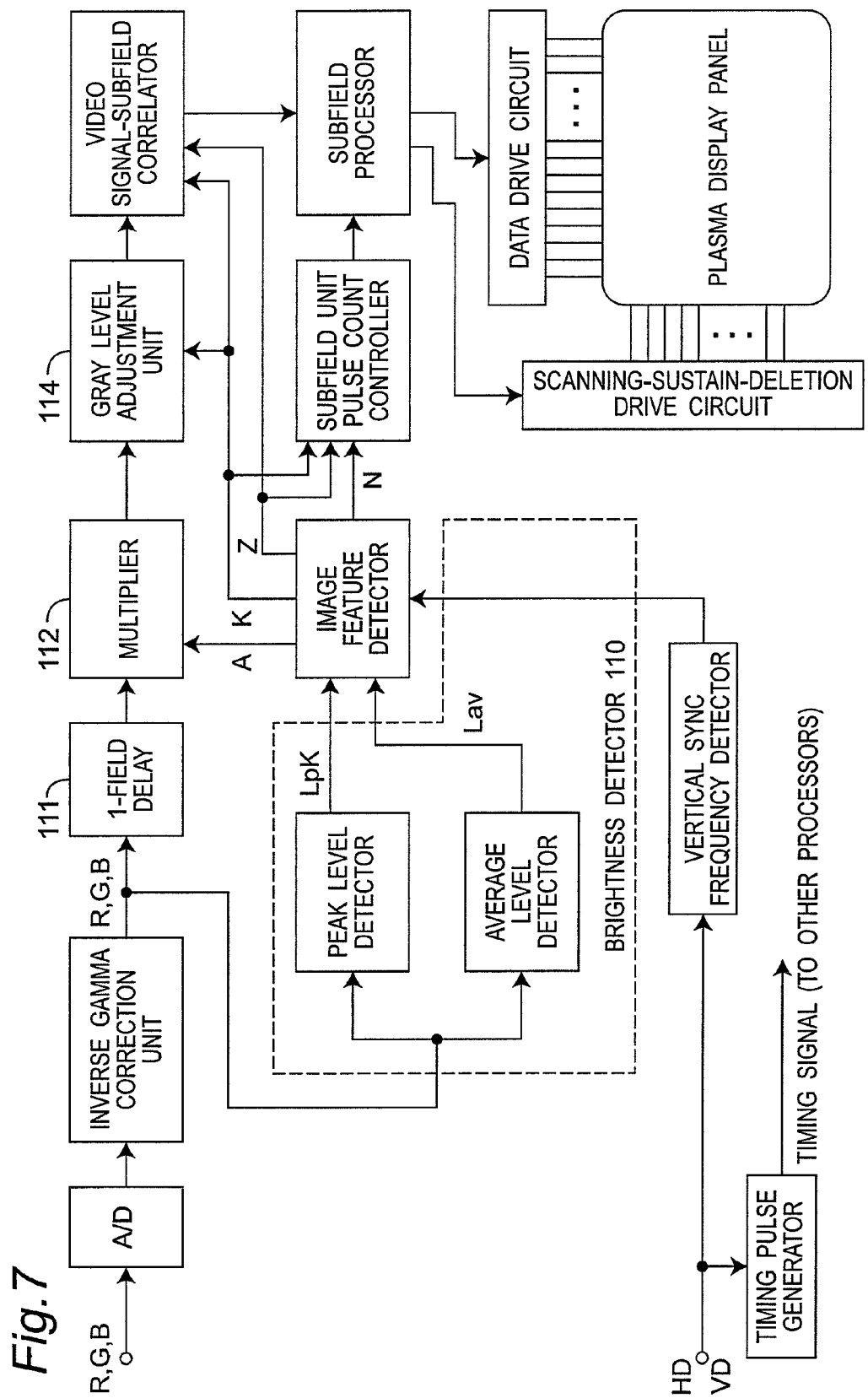
FIG. 7 is a block diagram of driving device according to the related art.

FIG. 4 is a block diagram of a driving device using a subfield driving method according to a second embodiment of the invention. This embodiment differs from the driving device shown in FIG. 1 in additionally having a compensation processing unit 12, latches 11 and 14, a compensation evaluation unit 16, a multiplier 18, and a selection unit 20. The compensation processing unit 12 and multiplier 18 together are referred to as a compensated sustain pulse data generator 19. As shown in FIG. 5 (E), the drive data generator 8 outputs the multiple of the mode selected by frame unit, that is, the drive multiple (drive multiple 0, drive multiple 1, drive multiple 2, and so forth) and the sustain pulse count data for that mode (drive data 0, drive data 1, drive data 2).

The drive multiple and sustain pulse count are read from a ROM table, for example, based on the video signal total from the predicted power detection unit 7.

As shown in FIG. 5 (H), the latch 11 holds the drive multiple for one frame period and outputs the drive multiple immediately before use. As shown in FIG. 5 (I), the latch 14 holds the fixed multiple coefficient Al, which is the feature data output from the feature output unit 9, for one frame period, and outputs the fixed multiple coefficient immediately before use.

Note that the parts identified by reference numerals 2, 4, 6, 7, 8, 9, 10, 22, 24, 26, 28, and 30 in FIG. 1 and described in the first embodiment have the same function in this second embodiment of the invention, and further description thereof is omitted. Note that the portion enclosed by the dotted line in FIG. 4 can be rendered on a semiconductor chip. The parts of the subfield processing unit 4 that insert a one frame delay can be rendered separately from the semiconductor chip.

As in the first embodiment, a 1-frame delay memory that delays the video data one frame is not used in the circuit block from the pin receiving the input signal to the subfield processing unit 4 in the driving device according to this second embodiment of the invention. More specifically, a 1-frame delay memory that delays the video data one frame is not used to absorb the 1-frame delay produced by the predicted power detection unit 7. Such a 1-frame delay memory device must have a very large capacity, and is therefore extremely expensive. The present invention does not require using such a 1-frame delay memory, and can therefore render the semiconductor chip inexpensively. The size of the semiconductor chip can also be reduced.

The operation of the driving device according to this embodiment of the invention is described next.

The compensation processing unit 12 receives both a direct drive multiple (such as drive multiple 1) that is directly generated by the drive data generator 8 from the drive data generator 8, and the previous drive multiple 0 generated the frame before from the latch 10. The compensation processing unit 12 also receives the direct fixed multiple coefficient Al (such as fixed multiple coefficient Al1) output directly from the feature output unit 9, and the previous fixed multiple coefficient Al0 output one frame before from the latch 14. The compensation processing unit 12 then computes the following equation (1).

Note that "direct" as used here refers to a signal that is generated substantially simultaneously to the output from the predicted power detection unit 7 without a one frame delay, and "previous" means a signal delayed approximately one frame from the output from the predicted power detection unit 7.

$$\text{(direct fixed multiple coefficient*direct drive multiple)/(previous fixed multiple coefficient*previous drive multiple)} \quad (1)$$

If the direct fixed multiple coefficient is Al1, the previous fixed multiple coefficient is Al0, the direct drive multiple is drive multiple 1, and the previous drive multiple is drive multiple 0, equation (1) is computed with the following substitutions.

$$(Al1*\text{drive multiple }1)/(Al0*\text{drive multiple }0) \quad (1')$$

The compensation processing unit 12 therefore outputs the values computed from equation (1) as shown in FIG. 5 (J). The multiplier 18 then multiplies the results from equation (1) by the previous sustain pulse data, and outputs the data described by equation (2).

$$\text{previous sustain pulse count*(previous fixed multiple coefficient*direct drive multiple)/(previous fixed multiple coefficient*direct drive multiple)} \quad (2)$$

If the previous sustain pulse data is denoted sustain pulse 0[i], equation (2) can be computed with the following substitutions.

$$\text{sustain pulse }0[i]*(Al1*\text{drive multiple }1)/(Al0*\text{drive multiple }0) \quad (2')$$

Note that [i] denotes the subfield number. If the number of subfields in drive data 0 is 8, the sustain pulse count of each subfield in order from the first subfield is sustain pulse 0[1], sustain pulse 0[2], sustain pulse 0[3], and so forth to sustain pulse 0[8].

The multiplier 18 therefore outputs the values calculated from equation (2) as shown in FIG. 5 (K). Because the compensated sustain pulse counts described by equation (2) are thus calculated by the compensation processing unit 12 and the multiplier 18 and output, the compensation processing unit 12 and multiplier 18 together are referred to as a compensated sustain pulse data generator 19.

The output from the multiplier 18 is output directly from the drive data output pin 22 by means of an intervening a selection unit 20 described below, and is applied to the scanning-sustain-deletion drive units 26 and 28.

There is always a proportional relationship between the drive multiple and sustain pulse data, and equation (3) below is therefore true.

$$\text{direct sustain pulse data/previous sustain pulse data H direct drive multiple/previous drive multiple} \quad (3)$$

Substituting the above specific values results in equation (3').

$$\text{sustain pulse }1[i]/\text{sustain pulse }0[i]\text{ H drive multiple }1/\text{drive multiple }0 \quad (3')$$

As a result, sustain pulse 0[i] can be expressed as follows.

$$\text{sustain pulse }0[i]\text{ H sustain pulse }1[i]*\text{drive multiple }0/\text{drive multiple }1 \quad (3'')$$

By substituting equation (3"), equation (2') can be rewritten as follows.

$$\text{H sustain pulse }1[i]*\text{drive multiple }0/\text{drive multiple }1*(Al1*\text{drive multiple }1)/(Al0*\text{drive multiple }0)$$

$$\text{H sustain pulse }1[i]*(Al1)/(Al0) \quad (2''')$$

The data shown in FIGS. 5 (F) and (K) is applied to drive the plasma display panel 30, and the actual display is driven using the data from the following equation (4).

$$(\text{video }1*Al0)[i]*\text{sustain pulse }0[i]*(Al1*\text{drive multiple }1)/(Al0*\text{drive multiple }0) \quad (4)$$

Substituting (2") into equation (4) results in the following.

$$H(\text{video }1*Al0)[i]*\text{sustain pulse }1[i]*(Al1)/(Al0)$$

$$H(\text{video }1*Al1)[i]*\text{sustain pulse }1[i] \quad (4')$$

As a result, the data is generated so that the 1-frame delayed data (Al0) contained in the data output from the subfield processing unit 4, and the 1-frame delayed data (Al0) contained in the data output from the compensated sustain pulse data generator 19 cancel each other out. Note that equation (4) is computed for each frame unit.

As will be known from equation (4'), the video, sustain pulse, and Al data actually displayed on the PDP 30 all have the same index ([1]), and are all generated based on the same video data. There is therefore no error caused by a frame offset in the data as described in the first embodiment, and an unnatural display can be prevented. This is further described with reference to FIG. 6.

FIG. 6 (A) shows the video signal total as an example of a quantity that is correlated to the brightness of the actual picture, and FIG. 6 (B) shows the mode of the sustain pulses output from the drive data generator 8. The video data brightness (FIG. 6 (A)) and the sustain pulse mode (FIG. 6 (B)) are multiplied together to obtain the average brightness of the video actually presented on the display (FIG. 6 (C)), that is, the power consumption. Because the display is driven using the result from equation (4'), the display is always driven using data from the same frame in this second embodiment of the invention. Unnatural images can therefore be prevented from being displayed, and average brightness or power consumption can be held substantially constant.

Returning to FIG. 4 again, the compensation evaluation unit 16 and selection unit 20 are described next.

The compensation evaluation unit 16 compares the following rate of change (direct fixed multiple coefficient*direct drive multiple)/(previous fixed multiple coefficient*previous drive multiple)

with a predetermined threshold value, outputs a high level signal if the rate of change is greater than the threshold value, and outputs a low level signal otherwise.

When the selection unit 20 receives a high signal from the compensation evaluation unit 16, it outputs the signal (the signal shown in FIG. 5 (K)) applied by the multiplier 18 to the input pin F2. If the selection unit 20 receives a low signal, it outputs the signal from the latch 10 (the signal in FIG. 5 (G)) at input pin F1.

More specifically, if the video signal total APL of the current frame video differs from that of the previous frame video by a predetermined level or more, that is, if there is a sharp change in the video, the signal processed by the compensation processing unit 12 and multiplied with the previous sustain pulse data by the multiplier 18 is used to display the content on the PDP 30. If the video signal total APL of the current frame video differs from that of the previous frame video by less than the predetermined level, that is, if there is not a sharp change in the video, the previous sustain pulse data is used to display the content on the PDP 30. This latter case is the same as the operation of the first embodiment.

Alternatively, the compensation evaluation unit 16 could differentiate between still pictures and video, output and the signal output from the selection unit 20 may be the signal applied to input pin F1 if a still picture is detected, and the signal applied to input pin F2 could be output if a moving picture is detected.

The compensation evaluation unit 16 and selection unit 20 may also be omitted. In this case the output from the multiplier 18 is always output from the drive data output pin 22.

Features of the video when the signal output from the multiplier 18 is used for displaying on the PDP 30 are described next.

As will be known from equation (2'), the signal output from the multiplier 18 is the (Al1*drive multiple 1)/(Al0*drive multiple 0) multiple of the sustain pulse 0[i].

The value (Al1*drive multiple 1)/(Al0*drive multiple 0) is not always an integer, and may be a fraction. For example, if (Al1*drive multiple 1)/(Al0*drive multiple 0) is 0.9 and the sustain pulse count changes 1, 2, 3, 4, 5, the sustain pulses used for displaying on the PDP 30 are 0.9, 1.8, 2.7, 3.6, and 4.5.

Because a fractional sustain pulse cannot actually be produced on the display of the PDP 30, the decimal portion must be truncated or rounded in some way. The result of rounding in bright image areas is virtually unrecognizable in the displayed image, but the result of rounding in a dark image can be seen by examining the brightness in the displayed image. For example, if the brightness of the original image is level 201 and is multiplied 0.9 times to become 180.9, rounding up results in a level of 181 while rounding down results in a level of 180. There is virtually no discernible difference between displaying level 180 and displaying level 181. However, if the original brightness level is 2 and is multiplied by 0.9, the result is 1.8 which goes to 2 if truncated up and 1 if truncated down. The difference between level 2 and level 1 is double the brightness, however, and is visible.

Processing the decimal portion of the sustain pulse count is not limited to rounding or truncating, however, and an integer conversion process that results in the least error in all signal levels may be used instead.

In practice, when a bright image with a low level area in one part and a dark image with a low level area in one part, such as a daytime picture of a dark well from above and a nighttime picture of a dark well from above, are rapidly exchanged in a series of frames, the problems caused by rounding are apparent. Such pictures rarely occur, however, and thus are not a problem.

The driving device using a subfield driving method according to this embodiment of the invention thus does not use a 1-frame delay memory and thus provides a low cost driving device.

In addition to being inexpensive, the driving device according to this second embodiment of the invention uses signals with no frame shifting and thus does not invite a drop in video quality even though the 1-frame delay memory is omitted.

Embodiment 3

Figure 8:
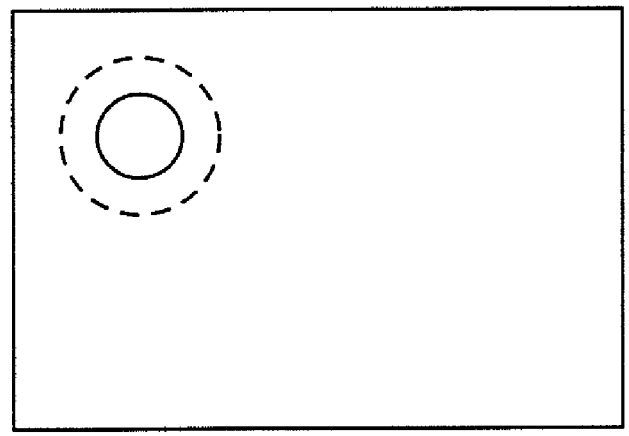
FIG. 8 shows an image of a daylight scene as an example of a bright image.
Figure 9:
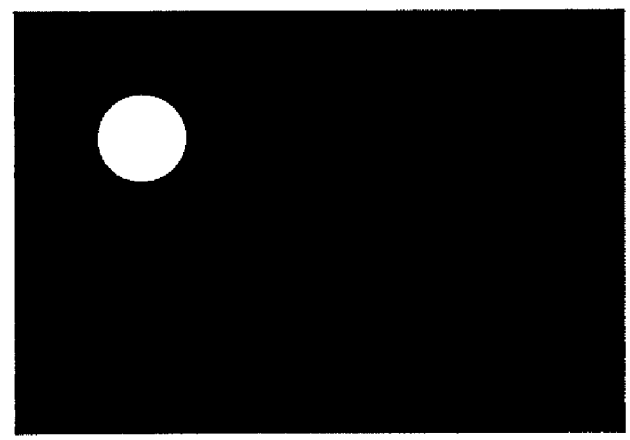
FIG. 9 shows an image of a night scene as an example of a dark image.

A third embodiment of the invention is described next with reference to FIG. 8 to FIG. 16. This third embodiment of the invention describes a driving device for resolving the problems that occur when the screen changes from a bright daylight scene as shown in FIG. 8 to a dark night scene as shown in FIG. 9. The 1× mode is generally selected for a bright daylight scene (FIG. 8) because sufficient brightness can be assured without increasing the drive multiple. Because the subject is dark in a dark night scene (FIG. 9), however, a mode with an increased drive multiple, such as the 5× mode, is set in order to increase the overall brightness and enable easier viewing. The following problems may occur when the mode multiple, that is, the drive multiple, is increased.

Figure 10:
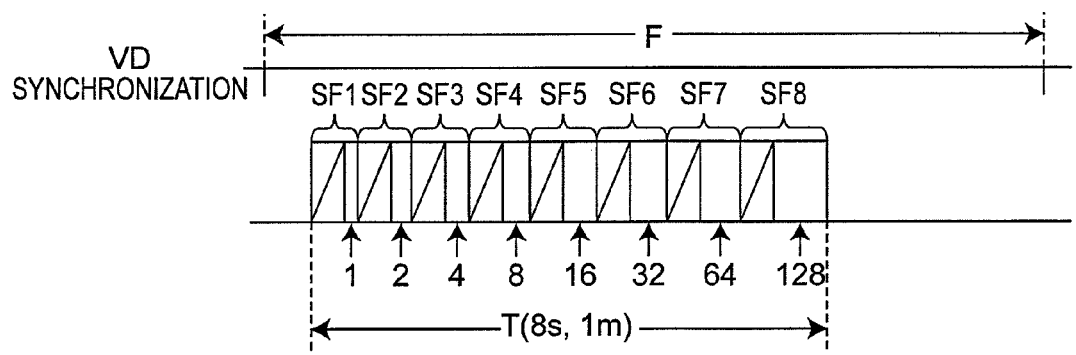
FIG. 10 shows the signal sequence for 8 subfields in the 1× mode.
Figure 11:
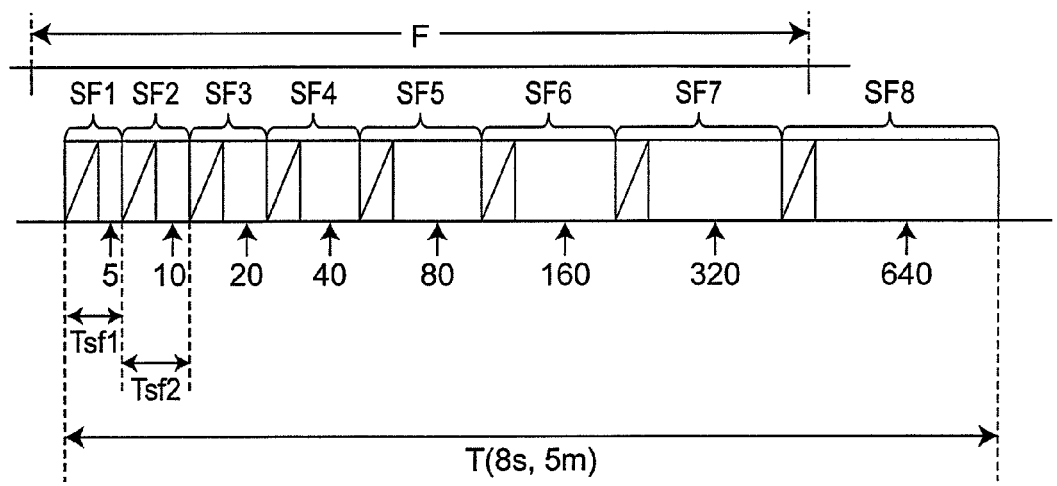
FIG. 11 shows the signal sequence for 8 subfields in the 5× mode.

FIG. 10 shows the signal train for eight subfields in the 1× mode, and FIG. 11 shows the signal train for eight subfields in the 5× mode. As shown in FIG. 10, in the 1× mode the eight subfields SF1, SF2, SF3, SF4, SF5, SF6, SF7, SF8 are respectively weighted to emit 1, 2, 4, 8, 16, 32, 64, and 128 sustain pulses, and fit within one frame period F. However, in the 5× mode, that is, when the drive multiple is 5×, the eight subfields SF1, SF2, SF3, SF4, SF5, SF6, SF7, SF8 are respectively weighted to emit 5, 10, 20, 40, 80, 160, 320, and 640 sustain pulses, and do not fit in one frame period F.

The processing time for one screen is T(S, M) where S is the number of subfields and M is the mode multiple. For example, in the 8 subfield, 1× mode, the processing time is T (8 s, 1 m), and in the 8 subfield, 5× mode, the processing time is T (8 s, 5 m). In the example shown in FIG. 10, $$T(8 \text{ s}, 1 \text{ m}) < F$$

and signal processing for one picture can be completed within one frame period F. In the example shown in FIG. 11, however, $$T(8 \text{ s}, 5 \text{ m}) > F$$

and signal processing for one picture cannot be completed within one frame period F.

More specifically, there is not enough time for signal processing in one frame period F, and data overflow occurs. An overflow process that drops the overflow subfield SF8 is conceivable, but this third embodiment applies a separate process. This separate process is any of the following three.
(A) A process that reduces the mode multiple
(B) A process that drops the first subfield
(C) A process that includes both (A) and (B)

Figure 12:
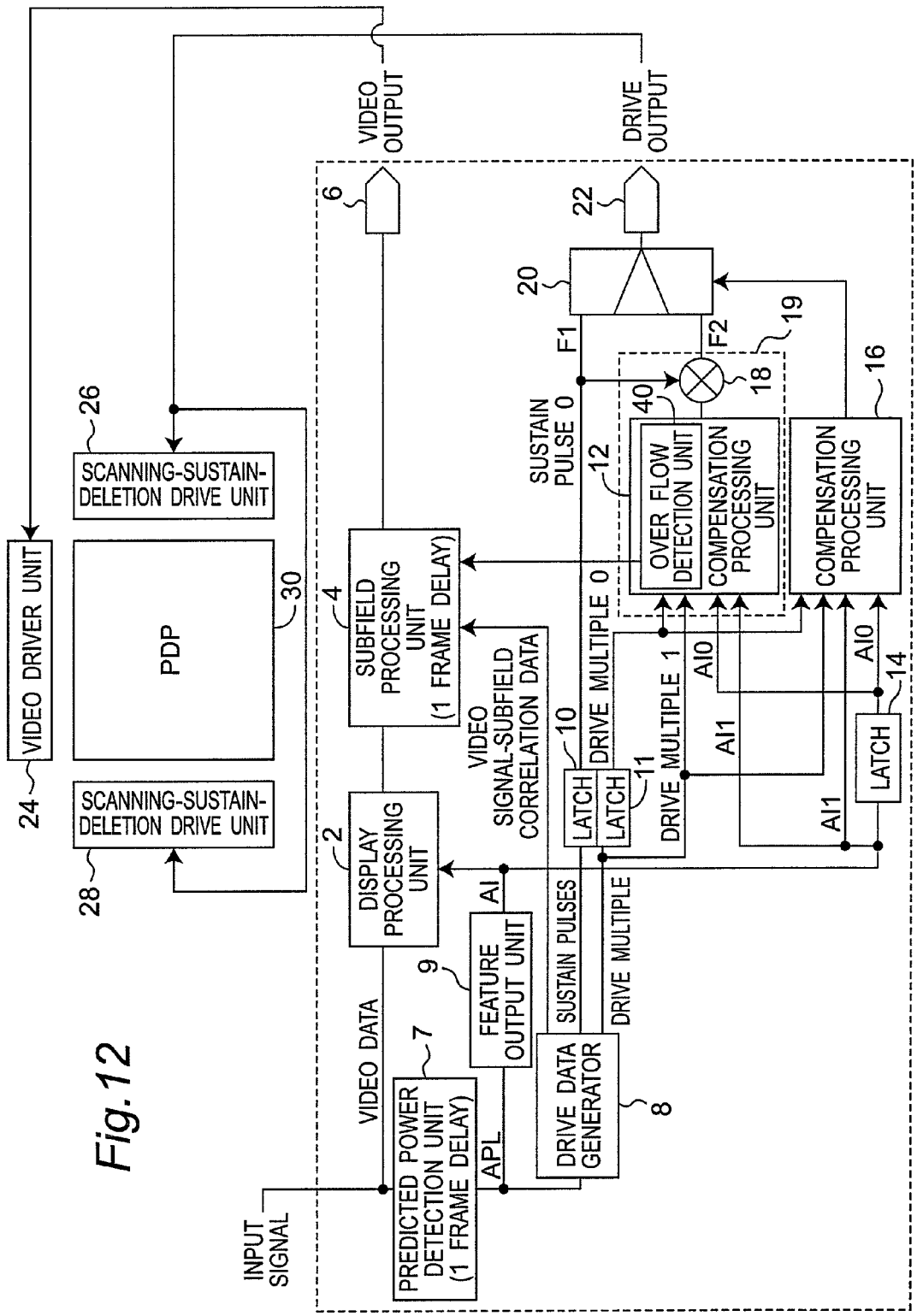
FIG. 12 is a block diagram of a driving device according to a third embodiment of the invention.

FIG. 12 is a block diagram of a driving device according to a third embodiment of the invention. This driving device differs from the driving device of the second embodiment shown in FIG. 4 in that an overflow detection unit 40 is disposed in the compensation processing unit 12, or more specifically in the compensated sustain pulse data generator 19, and the result of this overflow detection is output to the subfield processing unit 4. Other aspects of this embodiment are the same as the driving device according to the second embodiment of the invention described above.

When changing from a previous frame to the current frame, the overflow detection unit 40 determines if the mode multiple, that is, the drive multiple, has changed. The overflow detection unit 40 more particularly determines if the mode multiple (drive multiple) has increased, and executes one of the foregoing processes (A), (B), and (C) accordingly. Which process executes is preset in the driving device. For example, only process (C) is executed if the mode multiple increases.

Process (A) is described first.

Figure 13:
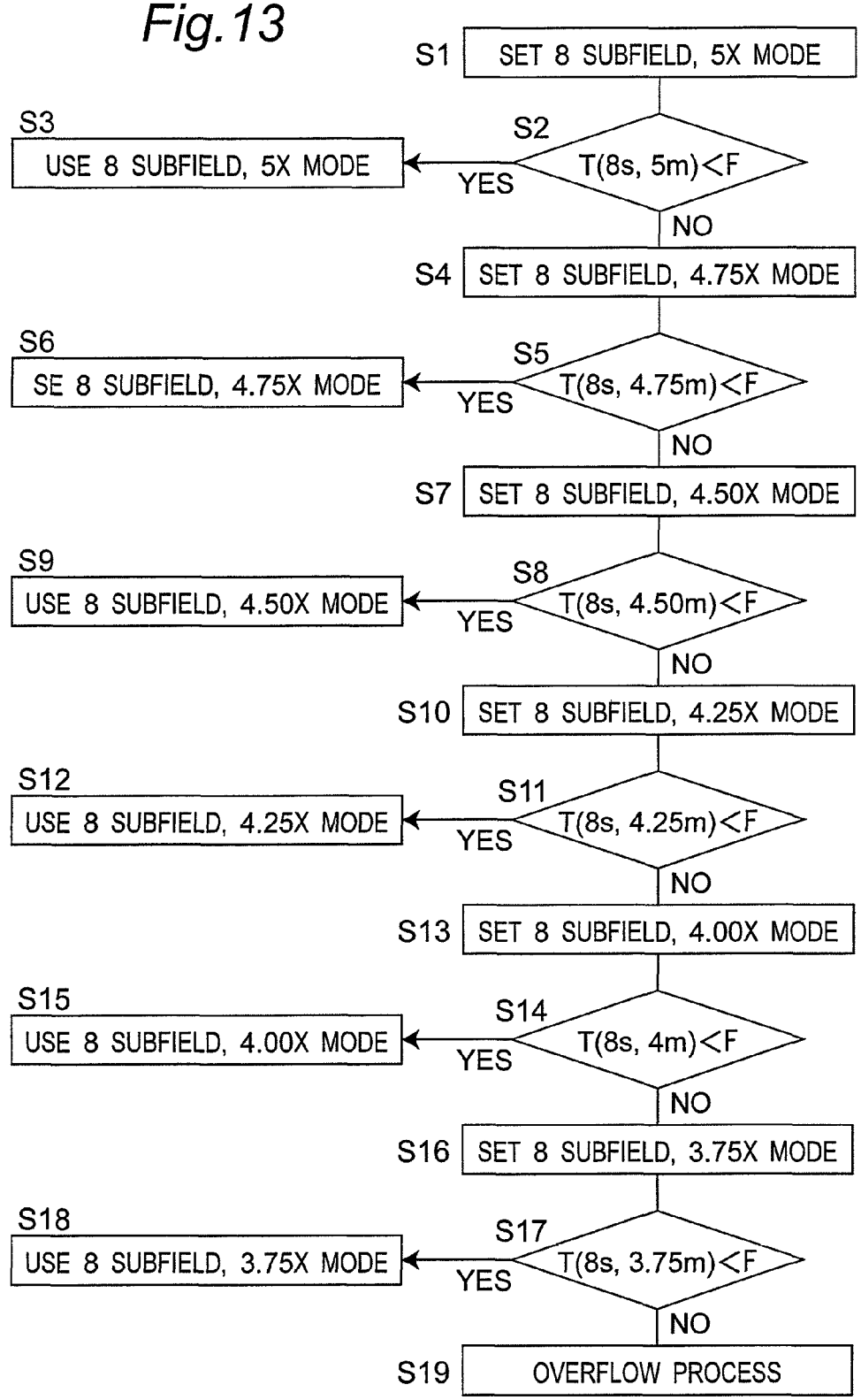
FIG. 13 is a flow chart of a process for dropping a subfield.

FIG. 13 is a flow chart describing process (A).

Before the operation shown in the flow chart starts, the predicted power detection unit 7 first calculates the sum of the signal levels of the R, G, and B video signals. The resulting sum indicates the brightness of the picture. The mode multiple is set so that it rises as the image becomes darker.

In this example, the overflow detection unit 40 detects that the display is driven with 8 subfields and the drive multiple is changing from 1× to 5×, and a frame is processed in the 5× mode for the first time after the mode multiple changes.

As a result of this detection, the 8 subfield, 5× mode is set in step S1.

In step S2, the 5× mode processing time T(8 s, 5 m) for 8 subfields is calculated to determine if the processing time is less than one frame period F. If the processing time is less, control goes to step S3 and processing the 8 subfields in the 5× mode is confirmed. If the processing time is greater, control goes to step S4.

In step S4 the drive multiple is set to a mode with a slightly lower multiple, such as a 4.75× mode. Note that this embodiment of the invention uses drive multiple settings in 0.25× increments, but smaller or larger increments may be used instead.

In step S5 the processing time T (8 s, 4.75 m) for 8 subfields in the 4.75× mode is calculated to determine if the processing time is less than one frame period F. If it is, control goes to step S6 and processing the 8 subfields in the 4.75× mode is confirmed. If the processing time is greater, control goes to step S7.

Operation proceeds thereafter executing steps S8 to S18 as necessary to incrementally reduce the drive multiple in order to fine the drive multiple at which the processing time is less than one frame period F. If the processing time will not fit within one frame period F even though the drive multiple has been lowered as much as possible, the overflow process executes (step S19). Note that this overflow process deletes the last subfield, which is subfield 8 in this example. Note also that the overflow process may be omitted.

In process (A) as described above the overflow detection unit 40 detects if the mode multiple (drive multiple) of the next frame is increased compared with the mode multiple (drive multiple) of the frame before, and gradually lowers the drive multiple of the next frame in predetermined increments until the drive data will fit in one frame period.

Therefore, by lowering the mode multiple when increasing the brightness of a dark image, image processing can be completed within one frame period F without deleting a subfield, and loss of image detail can thus be avoided.

Process (B) is described next.

Figure 14:
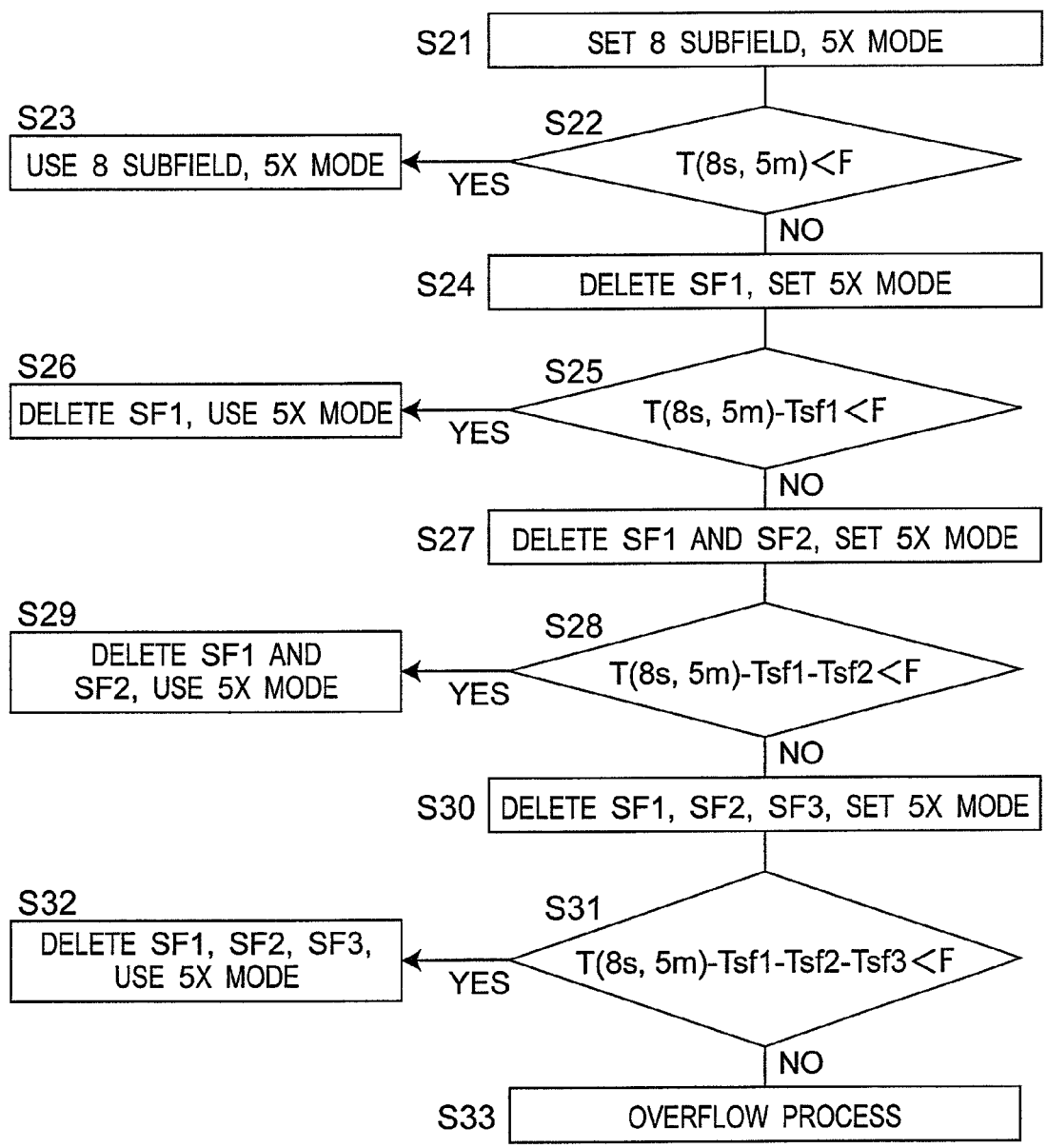
FIG. 14 is a flow chart of a process for reducing the mode multiple.

FIG. 14 is a flow chart describing process (B).

As in process (A) described above, the predicted power detection unit 7 first calculates the sum of the signal levels of the R, G, and B video signals before the operation shown in the flow chart starts. The resulting sum indicates the brightness of the picture. The mode multiple is set so that it rises as the image becomes darker.

In this example, the overflow detection unit 40 detects that the display is driven with 8 subfields and the drive multiple is changing from 1× to 5×, and a frame is processed in the 5× mode for the first time after the mode multiple changes.

As a result of this selection the 8 subfield, 5× mode is set in step S21.

In step S22, the 5× mode processing time T(8 s, 5 m) for 8 subfields is calculated to determine if the processing time is less than one frame period F. If the processing time is less, control goes to step S23 and processing the 8 subfields in the 5× mode is confirmed. If the processing time is greater, control goes to step S24.

In step S24 the first one subfield (SF1) is deleted and the 5× mode is set. The processing time T(8 s, 5 m) shown in FIG. 11 is thus shortened by the processing time Tsf1 of the first subfield SF1.

In step S25, whether this shortened processing time {T (8 s, 5 m)−Tsf1} is shorter than one frame period F is determined. If it is, control goes to step S26 and using the 5× mode with deleting one subfield SF1 is confirmed. If the processing time is greater, control goes to step S27.

In step S27 the next first subfield (SF2) is deleted and the 5× mode is set. As a result, the processing time T (8 s, 5 m) shown in FIG. 11 is shorted by the processing time (Tsf1+Tsf2) of the first two deleted subfields SF1 and SF2.

In step S28, whether this shortened processing time {T (8 s, 5 m)−Tsf1−Tsf2} is shorter than one frame period F is determined. If it is, control goes to step S29 and using the 5× mode with deleting two subfields SF1 and SF2 is confirmed. If the processing time is greater, control goes to step S30.

In step S30 the next first subfield (SF3) is deleted and the 5× mode is set. As a result, the processing time T (8 s, 5 m) shown in FIG. 11 is shorted by the processing time (Tsf1+Tsf2+Tsf3) of the first three deleted subfields SF1, SF2, and SF3.

In step S31, whether this shortened processing time {T (8 s, 5 m)−Tsf1−Tsf2−Tsf3} is shorter than one frame period F is determined. If it is, control goes to step S32 and using the 5× mode with deleting the three subfields SF1 SF2, SF3 is confirmed. If the processing time is greater, control goes to step S33.

The overflow process executes in step S33. Note that the overflow process may also be omitted.

In process (B) as described above the overflow detection unit 40 detects if the mode multiple (drive multiple) of the next frame is increased compared with the mode multiple (drive multiple) of the frame before. If the mode multiple increases, one or more subfields are deleted from the next frame starting from the lowest subfield number so that the drive data will fit in one frame period.

Therefore, by deleting subfields when increasing the brightness of a dark image, image processing can be completed within one frame period F without lowering the mode multiple, and a bright image can therefore be displayed.

Process (C) is described next.

Figure 15:
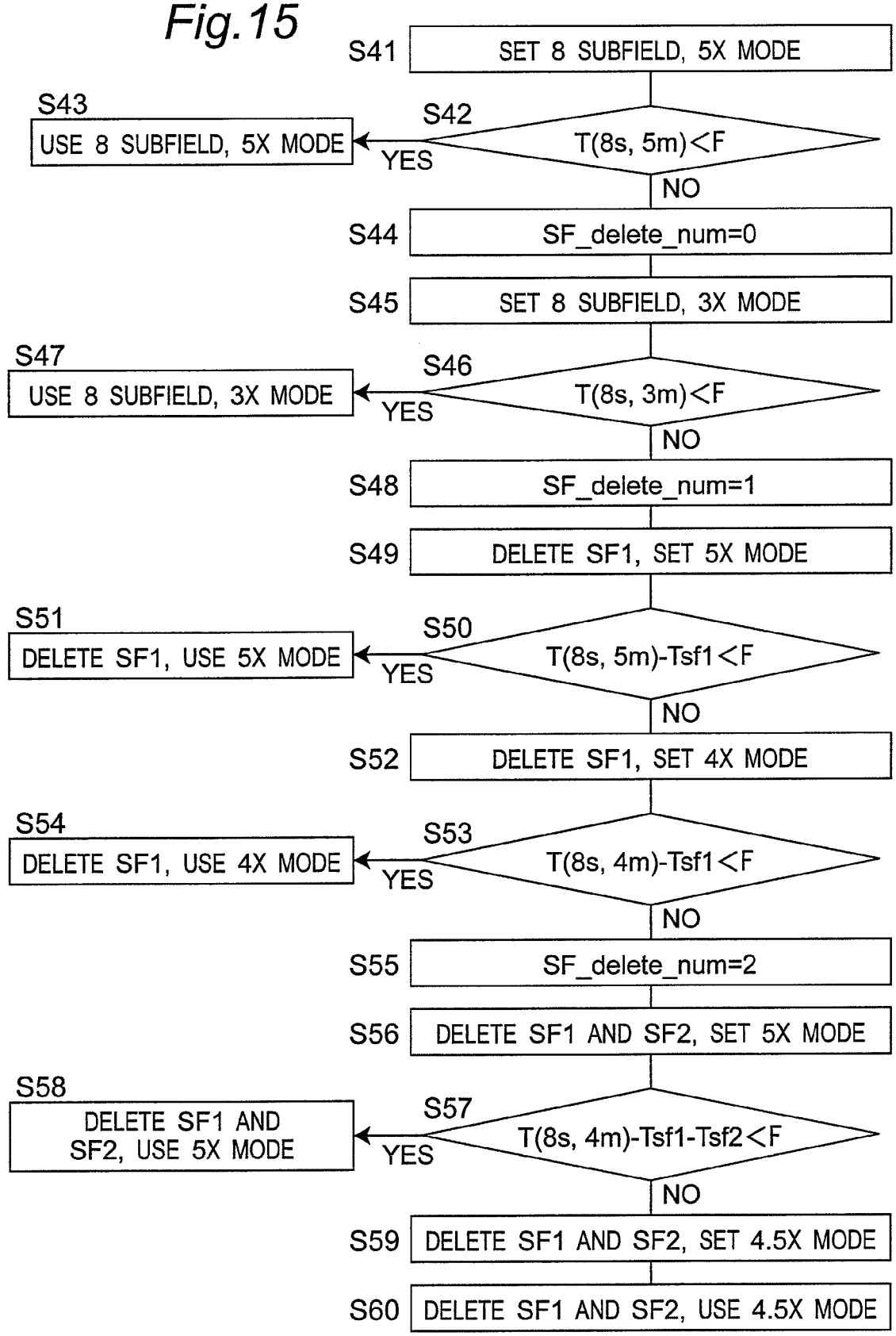
FIG. 15 is a flow chart of a process combining a process for dropping a subfield and a process for reducing the mode multiple.

FIG. 15 is a flow chart describing process (C).

As in process (A) described above, the predicted power detection unit 7 first calculates the sum of the signal levels of the R, G, and B video signals before the operation shown in the flow chart starts. In this example, the overflow detection unit 40 detects that the display is driven with 8 subfields and the drive multiple is changing from 1× to 5×, and a frame is processed in the 5× mode for the first time after the mode multiple changes.

As a result of this selection the 8 subfield, 5× mode is set in step S41.

In step S42, the 5× mode processing time T(8 s, 5 m) for 8 subfields is calculated to determine if the processing time is less than one frame period F. If the processing time is less, control goes to step S43 and processing the 8 subfields in the 5× mode is confirmed. If the processing time is greater, control goes to step S44.

In step S44 a flag SF_delete_num used to identify the number of subfields that can be deleted is reset to 0. More specifically, flag SF_delete_num=0 to prohibit subfield deletion.

In step S45 the mode multiple is lowered. In this example the 5× mode is lowered to the 3× mode. This sets processing 8 subfields in the 3× mode.

In step S46 the 3× mode processing time T(8 s, 3 m) for 8 subfields is calculated to determine if the processing time is less than one frame period F. If the processing time is less, control goes to step S47 and processing the 8 subfields in the 3× mode is confirmed. If the processing time is greater, control goes to step S48.

In step S48 the flag SF_delete_num identifying the number of subfields that can be deleted is set to 1, thus enabling deleting one subfield.

In step S49 a subfield deletion process executes. Because deleting one subfield is enabled, subfield SF1 is deleted and processing with the mode multiple set to the 5× mode is set. As described in step S24 above, this shortens the processing time.

In step S50, whether this shortened processing time {T (8 s, 5 m)−Tsf1} is shorter than one frame period F is determined. If it is, control goes to step S51 and using the 5× mode with deleting one subfield SF1 is confirmed. If the processing time is greater, control goes to step S52.

In step S52 a subfield deletion process and a process lowering the mode multiple execute. Because deleting one subfield is enabled in this case, subfield SF1 is deleted and the mode multiple is lowered from the 5× mode to the 4× mode. As described in step S24 above, this shortens the processing time.

In step S53 whether this shortened processing time {T (8 s, 4 m)−Tsf1} is shorter than one frame period F is determined. If it is, control goes to step S54 and using the 4× mode with deleting one subfield SF1 is confirmed. If the processing time is greater, control goes to step S55.

In step S55 the flag SF_delete_num identifying the number of subfields that can be deleted is set to 2, thus enabling deleting two subfields (SF1 and SF2).

In step S56 a subfield deletion process executes. Because deleting two subfields is enabled in this case, subfields SF1 and SF2 are deleted and processing with the mode multiple set to the 5× mode is set.

In step S57, whether this shortened processing time {T (8 s, 5 m)−Tsf1−Tsf2} is shorter than one frame period F is determined. If it is, control goes to step S58 and using the 5× mode with deleting two subfields SF1 and SF2 is confirmed. If the processing time is greater, control goes to step S59.

In step S59 a subfield deletion process and a process lowering the mode multiple execute. Because deleting two subfields is enabled in this case, subfields SF1 and SF2 are deleted and the mode multiple is lowered from the 5× mode to the subfield 4.5× mode.

In step S60 deleting two subfields SF1 and SF2 and using the 4.5× mode are confirmed.

In process (C) as described above the overflow detection unit 40 detects if the mode multiple (drive multiple) of the next frame is increased compared with the mode multiple (drive multiple) of the frame before. If the mode multiple increases, one or more subfields are deleted from the next frame starting from the lowest subfield number while also lowering the drive multiple of the next frame so that the drive data will fit in one frame period.

By thus using both a process to lower the mode multiple and a process of deleting subfields when increasing the brightness of a dark image, image processing can be completed within one frame period F without losing image detail while also achieving sufficient brightness.

FIG. 16 is a timing chart of output signals from main parts of the driving device shown in FIG. 12, and describes processing before and after a change from a bright scene (such as the daylight scene in FIG. 8) to a dark scene (such as the night scene in FIG. 9).

FIG. 16 (A) shows the time line of a four frame video sequence in which video 0 and video 1 are daylight scenes and video 2 and video 3 are night scenes.

In the daylight scenes shown in video 0 and 1, 1× data is output as the product calculated by the multiplier 18 as shown in FIGS. 16 (B) and (C). In video 2, which changes from a daylight scene to a night scene, 5× data is output as the result as shown in FIGS. 16 (B) and (D). If none of the foregoing processes (A), (B), or (C) is applied in this case, the sustain pulse count of the subfield will be simply multiplied five times, and a total 1275 sustain pulses will be output using 8 subfields. Because signal processing cannot be completed in one frame period F in this case as shown in FIG. 11, one of the processes (A), (B), or (C) is applied as described in the third embodiment. This enables increasing the brightness of the displayed video in one frame period F.

One of processes (A), (B), or (C) can be used with the dark scene that follows in video 3, but the subfield count and sustain pulse count already determined for video 2 are used instead. This combined data is stored in a table and is read from the table while or before the first dark scene (video 2 in this case) is processed. As a result, the second field in the dark scene is processed using the 5× data read from the table as 1× (in the shown example there are six subfields) as shown in FIG. 16 (E).

The processes (A), (B), or (C) described in the third embodiment are thus efficient processes for scenes in which the mode multiple changes, and particularly for scenes in which the mode multiple increases.

As described above, when the mode multiple increases M times (where M is an integer), the sustain pulse count of each subfield also increases M times. However, there are cases in which all subfields with an increased mode multiple will not fit in one frame period F. In such cases subfields may be deleted from the lower subfield number or the mode multiple M may be decreased to avoid images that are excessively dark or lacking in detail.

INDUSTRIAL APPLICABILITY

The invention can be used in a driving device, a driving method, and a semiconductor device (IC chip) for driving a display panel.

The invention claimed is:

1. A driving device comprising:
a predicted power detection unit that receives approximately one frame of video data, calculates power consumption for that frame, and outputs a predicted power consumption value;
a feature output unit that outputs a fixed multiple coefficient representing a feature of the video data based on the predicted power consumption;
a display processing unit that adjusts the video data using the fixed multiple coefficient and outputs the adjusted video data;
a subfield processing unit that outputs a subfield signal after approximately one frame period based on the adjusted video data;
a drive data generating unit that generates drive data including sustain pulse data based on the predicted power consumption; and
a latch that holds the sustain pulse data one frame period and outputs the previous sustain pulse data;
wherein the driving device drives a display panel by means of the subfield signal and previous sustain pulse data.

2. A driving device comprising:
a predicted power detection unit that receives approximately one frame of video data, calculates power consumption for that frame, and outputs a predicted power consumption value;
a feature output unit that outputs a fixed multiple coefficient representing a feature of the video data based on the predicted power consumption;
a display processing unit that adjusts the video data using the fixed multiple coefficient and outputs the adjusted video data;
a subfield processing unit that outputs a subfield signal after approximately one frame period based on the adjusted video data;
a drive data generating unit that generates drive data including sustain pulse data and a drive multiple based on the predicted power consumption;
a first latch that holds the sustain pulse data one frame period and outputs the previous sustain pulse data;
a second latch that holds the drive multiple one frame period and outputs the previous drive multiple;
a third latch that holds the fixed multiple coefficient one frame period and outputs the previous fixed multiple coefficient; and a compensated sustain pulse data generating unit that receives a direct drive multiple from the drive data generating unit, a direct fixed multiple coefficient from the feature output unit, the previous drive multiple from the second latch, the previous fixed multiple coefficient from the third latch, and the previous sustain pulse data from the first latch, and outputs compensated sustain pulse data;
wherein the driving device drives a display panel by means of the subfield signal and compensated sustain pulse data.

3. The driving device described in claim 2, wherein:
the compensated sustain pulse data is calculated using the equation $$\text{previous sustain pulse count} * (\text{direct fixed multiple coefficient} * \text{direct drive multiple}) / (\text{previous fixed multiple coefficient} * \text{previous drive multiple}).$$

4. The driving device described in claim 2, further comprising:
a compensation evaluation unit; and
a selection unit that receives previous sustain pulse data and compensated sustain pulse data;
wherein the compensation evaluation unit receives the direct fixed multiple coefficient from the feature output unit, the previous fixed multiple coefficient from the third latch, the direct drive multiple from the drive data generating unit, and the previous drive multiple from the second latch,
compares the rate of change $$(\text{direct fixed multiple coefficient} * \text{direct drive multiple}) / (\text{previous fixed multiple coefficient} * \text{previous drive multiple})$$

with a predetermined threshold value, outputs the compensated sustain pulse data from the selection unit if the rate of change is greater than the threshold value, and outputs the previous sustain pulse data from the selection unit if the rate of change is less than or equal to threshold value.

5. The driving device described in claim 2, further comprising:
an overflow detection unit;
wherein the overflow detection unit detects if the drive multiple of a next frame is increased from the drive multiple of the frame therebefore, and renders the drive data in one frame period by lowering the drive multiple of the next frame by a predetermined multiple.

6. The driving device described in claim 2, further comprising:
an overflow detection unit;
wherein the overflow detection unit detects if the drive multiple of a next frame is increased from the drive multiple of the frame therebefore, and renders the drive data in one frame period by deleting one or more subfields from the next frame in order from the lowest subfield number.

7. The driving device described in claim 2, further comprising:
an overflow detection unit;
wherein the overflow detection unit detects if the drive multiple of a next frame is increased from the drive multiple of the frame therebefore, and renders the drive data in one frame period by lowering the drive multiple of the next frame by a predetermined multiple and deleting one or more subfields from the next frame in order from the lowest subfield number.

8. An IC chip comprising:

a predicted power detection unit that receives approximately one frame of video data, calculates power consumption for that frame, and outputs a predicted power consumption value;

a feature output unit that outputs a fixed multiple coefficient representing a feature of the video data based on the predicted power consumption;

a display processing unit that adjusts the video data using the fixed multiple coefficient and outputs the adjusted video data;

a subfield processing unit that outputs a subfield signal after approximately one frame period based on the adjusted video data;

a drive data generating unit that generates drive data including sustain pulse data based on the predicted power consumption; and a latch that holds the sustain pulse data one frame period and outputs the previous sustain pulse data;

wherein the driving device drives a display panel by means of the subfield signal and previous sustain pulse data.

9. An IC chip comprising:

a predicted power detection unit that receives approximately one frame of video data, calculates power consumption for that frame, and outputs a predicted power consumption value;

a feature output unit that outputs a fixed multiple coefficient representing a feature of the video data based on the predicted power consumption;

a display processing unit that adjusts the video data using the fixed multiple coefficient and outputs the adjusted video data;

a subfield processing unit that outputs a subfield signal after approximately one frame period based on the adjusted video data;

a drive data generating unit that generates drive data including sustain pulse data and a drive multiple based on the predicted power consumption;

a first latch that holds the sustain pulse data one frame period and outputs the previous sustain pulse data;

a second latch that holds the drive multiple one frame period and outputs the previous drive multiple;

a third latch that holds the fixed multiple coefficient one frame period and outputs the previous fixed multiple coefficient; and a compensated sustain pulse data generating unit that receives a direct drive multiple from the drive data generating unit, a direct fixed multiple coefficient from the feature output unit, the previous drive multiple from the second latch, and the previous fixed multiple coefficient from the third latch, and outputs compensated sustain pulse data;

wherein the IC chip drives a display panel by means of the subfield signal and compensated sustain pulse data.

10. The IC chip described in claim 9, wherein:

the compensated sustain pulse data is calculated using the equation $$\text{previous sustain pulse count} * (\text{direct fixed multiple coefficient} * \text{direct drive multiple}) / (\text{previous fixed multiple coefficient} * \text{previous drive multiple}).$$

11. The IC chip described in claim 9, further comprising:

an overflow detection unit;

wherein the overflow detection unit detects if the drive multiple of a next frame is increased from the drive multiple of the frame therebefore, and renders the drive data in one frame period by lowering the drive multiple of the next frame by a predetermined multiple.

12. The IC chip described in claim 9, further comprising:

an overflow detection unit;

wherein the overflow detection unit detects if the drive multiple of a next frame is increased from the drive multiple of the frame therebefore, and renders the drive data in one frame period by deleting one or more subfields from the next frame in order from the lowest subfield number.

13. The IC chip described in claim 9, further comprising:

an overflow detection unit;

wherein the overflow detection unit detects if the drive multiple of a next frame is increased from the drive multiple of the frame therebefore, and renders the drive data in one frame period by lowering the drive multiple of the next frame by a predetermined multiple and deleting one or more subfields from the next frame in order from the lowest subfield number.

14. A driving method comprising steps of:

receiving approximately one frame of video data, calculating power consumption for that frame, and outputting a predicted power consumption value;

outputting a fixed multiple coefficient representing a feature of the video data based on the predicted power consumption;

adjusting the video data using the fixed multiple coefficient and outputting the adjusted video data;

outputting a subfield signal after approximately one frame period based on the adjusted video data;

generating drive data including sustain pulse data based on the predicted power consumption;

holding the sustain pulse data one frame period and outputting the previous sustain pulse data; and driving a display panel by means of subfield signals and the previous sustain pulse data.

15. A driving method comprising steps of:

receiving approximately one frame of video data, calculating power consumption for that frame, and outputting a predicted power consumption value;

outputting a fixed multiple coefficient representing a feature of the video data based on the predicted power consumption;

adjusting the video data using the fixed multiple coefficient and outputting the adjusted video data;

outputting a subfield signal after approximately one frame period based on the adjusted video data;

generating drive data including sustain pulse data and a drive multiple based on the predicted power consumption;

holding the sustain pulse data one frame period and outputting the previous sustain pulse data;

holding the drive multiple one frame period and outputting the previous drive multiple;

holding the fixed multiple coefficient one frame period and outputting the previous fixed multiple coefficient;

receiving a direct drive multiple, a direct fixed multiple coefficient, the previous drive multiple, and the previous fixed multiple coefficient, and outputting compensated sustain pulse data; and driving a display panel by means of the subfield signal and compensated sustain pulse data.

16. The driving method described in claim 15, wherein:
the compensated sustain pulse data is calculated using the equation $$\text{previous sustain pulse count} * (\text{direct fixed multiple coefficient} * \text{direct drive multiple}) / (\text{previous fixed multiple coefficient} * \text{previous drive multiple}).$$

17. The driving method described in claim 15, further comprising a step of:
detecting if the drive multiple of a next frame is increased from the drive multiple of the frame therebefore, and rendering the drive data in one frame period by lowering the drive multiple of the next frame by a predetermined multiple.

18. The driving method described in claim 15, further comprising a step of:
detecting if the drive multiple of a next frame is increased from the drive multiple of the frame therebefore, and rendering the drive data in one frame period by deleting one or more subfields from the next frame in order from the lowest subfield number.

19. The driving method described in claim 15, further comprising a step of:
detecting if the drive multiple of a next frame is increased from the drive multiple of the frame therebefore, and rendering the drive data in one frame period by lowering the drive multiple of the next frame by a predetermined multiple and deleting one or more subfields from the next frame in order from the lowest subfield number.

* * * * *